United States Patent
Jung et al.

(10) Patent No.: US 11,914,392 B2
(45) Date of Patent: Feb. 27, 2024

(54) MOVING ROBOT SYSTEM AND METHOD FOR GENERATING BOUNDARY INFORMATION OF THE SAME

(71) Applicant: LG ELECTRONICS INC., Seoul (KR)

(72) Inventors: Minkuk Jung, Seoul (KR); Jeongwoo Ju, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 325 days.

(21) Appl. No.: 17/224,278

(22) Filed: Apr. 7, 2021

(65) Prior Publication Data

US 2021/0373571 A1 Dec. 2, 2021

(30) Foreign Application Priority Data

May 26, 2020 (KR) .................. 10-2020-0063229

(51) Int. Cl.
*G05D 1/02* (2020.01)
*G05D 1/00* (2006.01)

(52) U.S. Cl.
CPC ......... *G05D 1/0274* (2013.01); *G05D 1/0088* (2013.01); *G05D 1/028* (2013.01); *G05D 1/0234* (2013.01); *G05D 1/0255* (2013.01); *G05D 1/0278* (2013.01); *G05D 2201/0203* (2013.01); *G05D 2201/0208* (2013.01)

(58) Field of Classification Search
CPC .. G05D 1/0274; G05D 1/0088; G05D 1/0234; G05D 1/0255; G05D 1/028; G05D 1/0278; G05D 2201/0203; G05D 2201/0208; G05D 1/0282; B25J 9/1602; B25J 9/1664; B25J 9/1674; B25J 9/1692; B25J 9/1694; B25J 11/008; A01D 34/008
USPC .......................................... 701/23
See application file for complete search history.

(56) References Cited

U.S. PATENT DOCUMENTS

| | | | |
|---|---|---|---|
| 5,944,132 A | * | 8/1999 | Davies .................. A63B 69/36 701/470 |
| 11,243,545 B1 | * | 2/2022 | Ebrahimi Afrouzi ...................... G05D 1/0234 |
| 2009/0021397 A1 | * | 1/2009 | Wipf .................... G08G 5/0013 340/945 |

(Continued)

FOREIGN PATENT DOCUMENTS

| KR | 2017-0048815 A | 5/2017 |
|---|---|---|
| KR | 2018-0024467 A | 3/2018 |

(Continued)

OTHER PUBLICATIONS

Korean Office Action dated Aug. 12, 2021 issued in Application 10-2020-0063229.

(Continued)

*Primary Examiner* — Vivek D Koppikar
*Assistant Examiner* — Dominick Mulder
(74) *Attorney, Agent, or Firm* — KED & ASSOCIATES, LLP

(57) ABSTRACT

The present disclosure relates to a moving robot system and a method for generating boundary information of the moving robot system that generates boundary information based on actual installation positions of a plurality of transmission devices when the plurality of transmission devices is installed based on map data provided from a web server.

18 Claims, 17 Drawing Sheets

(56) References Cited

U.S. PATENT DOCUMENTS

| | | | |
|---|---|---|---|
| 2012/0027221 A1* | 2/2012 | Davis | H04L 49/35 381/86 |
| 2013/0138247 A1* | 5/2013 | Gutmann | G01S 17/06 901/1 |
| 2014/0207282 A1* | 7/2014 | Angle | H04L 12/2809 901/1 |
| 2014/0274125 A1* | 9/2014 | Sendonaris | G01S 5/02 455/456.1 |
| 2015/0111524 A1* | 4/2015 | South | G08B 27/001 455/404.2 |
| 2016/0100522 A1* | 4/2016 | Yamauchi | G05D 1/0212 701/25 |
| 2017/0010122 A1* | 1/2017 | Abe | G08G 1/096775 |
| 2017/0026818 A1* | 1/2017 | Beaulieu | G01S 1/024 |
| 2017/0064667 A1* | 3/2017 | Mycek | H04W 64/00 |
| 2017/0150676 A1 | 6/2017 | Yamauchi et al. | |
| 2017/0364901 A1* | 12/2017 | Chandrasekaran | H04W 12/08 |
| 2018/0317725 A1 | 11/2018 | Lee et al. | |
| 2019/0049984 A1* | 2/2019 | Wong | G05D 1/0225 |
| 2019/0163175 A1 | 5/2019 | Ko et al. | |
| 2019/0250604 A1 | 8/2019 | Balutis et al. | |
| 2020/0037498 A1 | 2/2020 | Ko et al. | |
| 2020/0249694 A1* | 8/2020 | Joshi | G05D 1/0276 |
| 2020/0393566 A1* | 12/2020 | Zeng | G01S 7/4808 |
| 2021/0100160 A1* | 4/2021 | Kang | A01D 34/008 |
| 2021/0283773 A1 | 9/2021 | Ahn et al. | |

FOREIGN PATENT DOCUMENTS

| | | |
|---|---|---|
| KR | 2020-0018199 A | 2/2020 |
| KR | 10-2070068 B1 | 3/2020 |

OTHER PUBLICATIONS

International Search Report and Written Opinion dated Aug. 25, 2021 issued in Application PCT/KR2021/004959.

* cited by examiner

MOVING ROBOT SYSTEM AND METHOD FOR GENERATING BOUNDARY INFORMATION OF THE SAME

CROSS-REFERENCE TO RELATED APPLICATION

This application claims priority under 35 U.S.C. § 119 to Korean Application No. 10-2020-0063229 filed on May 26, 2020, whose entire disclosure is hereby incorporated by reference.

BACKGROUND

1. Field

The present disclosure relates to a moving robot system that autonomously travels in a travel area, and a method for generating boundary information of the moving robot system.

2. Background

Generally, a moving robot is a device that automatically performs a predetermined operation while traveling by itself in a predetermined area without a user's operation. The moving robot senses obstacles located in the area and performs its operations by moving close to or away from such obstacles.

Such a moving robot may include a cleaning robot that carries out cleaning while traveling in the predetermined area, as well as a moving robot that mows a lawn in the predetermined area. Generally, lawn mower devices include a riding-type device that moves according to a user's operation to cut a lawn or perform weeding when the user rides on the device, and a work-behind type or hand type device that is manually pushed or pulled by the user to move and cut a lawn. However, since the lawn mower devices move and cut a lawn according to direct operations by a user, it may be inconvenient for the user. Accordingly, research has been conducted on a moving robot-type mower device including elements that cuts a lawn.

Such a moving robot for lawn mowing (lawn mower) operates outdoors rather than indoors, and thus the moving robot for lawn mowing moves in a wider area compared to a moving robot traveling in an indoor area. In the case of indoors, a surface of a floor is monotonous (or flat), and factors such as terrain and objects affecting traveling of a moving robot are limited. In particular, since the moving robot may travel in a wide area without limits due to a nature of outdoors, it is necessary to set a travel area for the moving robot. Therefore, a travel area for the moving robot, that is, a boundary area needs to be set and accurately recognized.

Meanwhile, U.S. Patent Publication No. 2017-0150676 (published on Jun. 1, 2017) (hereinafter referred to as "related art document") discloses a technology in which a plurality of beacons installed at a boundary of a travel area is used in determining relative positions of a robot based on signals transmitted from the beacons while the robot is traveling along the boundary, so that coordinate information stored accordingly is used in determining a position of the robot. That is, in the related art document, as the plurality of beacons installed in a distributed manner at the boundary of the travel area transmits and receives signals to set a travel area, a travel area/position of the robot can be accurately recognized. Accordingly, limitations in recognizing positions of the moving robot system can be partially improved.

However, the technology in the related art document has a limitation in that the boundary area is set only by simply installing beacons to thereby limiting the setting of boundary. In addition, since the boundary area is set only according to an installation state of the beacons, there is a concern that the boundary may be formed incorrectly depending on a communication performance of the beacons. In other words, the related art technology of boundary setting has a limitation when setting a boundary according to a user's request and thus making it difficult to set a boundary accurately. As a result, in the related art, a technology for accurately and conveniently setting a boundary according to a user's request has not been proposed, and therefore, usability, safety, reliability and convenience of the moving robot are limited.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1A:
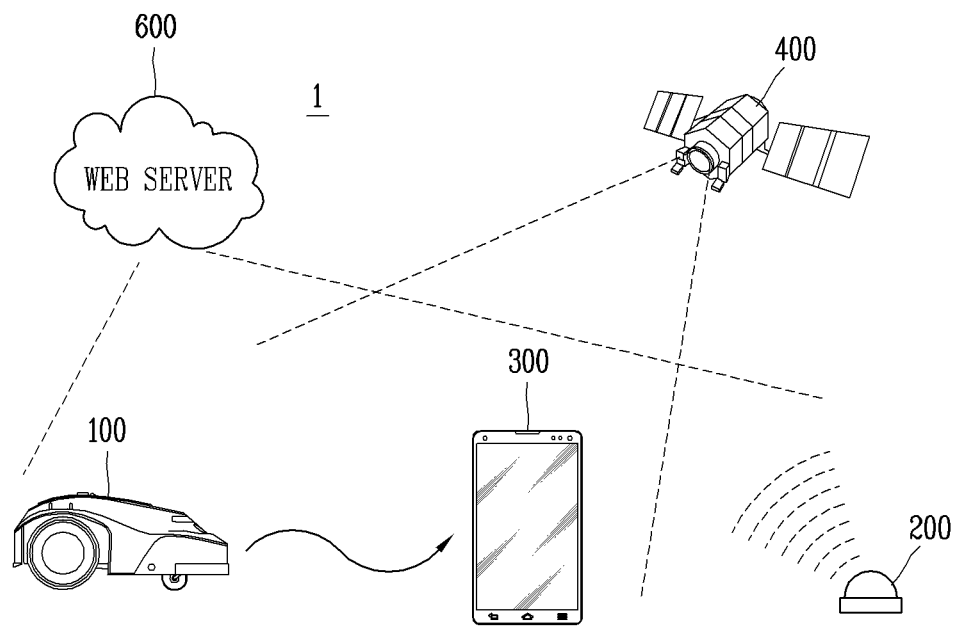
FIG. 1A is a conceptual view illustrating a traveling principle of a moving robot system.

Hereinafter, embodiments of a moving robot system and a method for controlling the moving robot according to the present disclosure will be described in detail with reference to the accompanying drawings, and the same reference numerals are used to designate the same/like components and redundant description thereof will be omitted.

In describing technologies disclosed in the present disclosure, if a detailed explanation for a related known function or construction is considered to unnecessarily divert the idea of the technologies in the present disclosure, such explanation has been omitted but would be understood by those skilled in the art. It should be noted that the attached drawings are provided to facilitate understanding of the technical idea disclosed in this specification, and should not be construed as limiting the technical idea by the attached drawings.

Hereinafter, an embodiment of a moving robot system (hereinafter referred to as a "system") will be described. In the system, the moving robot may refer to a robot, a lawn-mowing moving robot, a lawn mowing robot, a lawn mowing device, or a moving robot for lawn mowing capable of traveling autonomously.

The system may be a system of a moving robot (hereinafter referred to as a "robot") that cuts a lawn in a travel area. Here, the robot refers to a lawn mower robot, and accordingly, the system 1 may refer to a traveling/control/operation system of a lawn mower robot that cuts a lawn in a travel area.

As illustrated in FIG. 1A, the system 1 includes a terminal 300 displaying a control screen for controlling operation of a robot 100, and the robot 100 operating in response to an input (or manipulation) on the control screen. In more detail, the terminal 300 displays the control screen for controlling the robot 100 on a display of the terminal 300, and the robot 100 may be operated to cut a lawn in the travel area while traveling according to the input on the control screen. The system 1 may further include at least one selected from a transmission device 200, a GPS satellite 400, and a web server 600 transmitting and receiving signals to and from at least one of the robot 100 and the terminal 300.

Figure 1B:
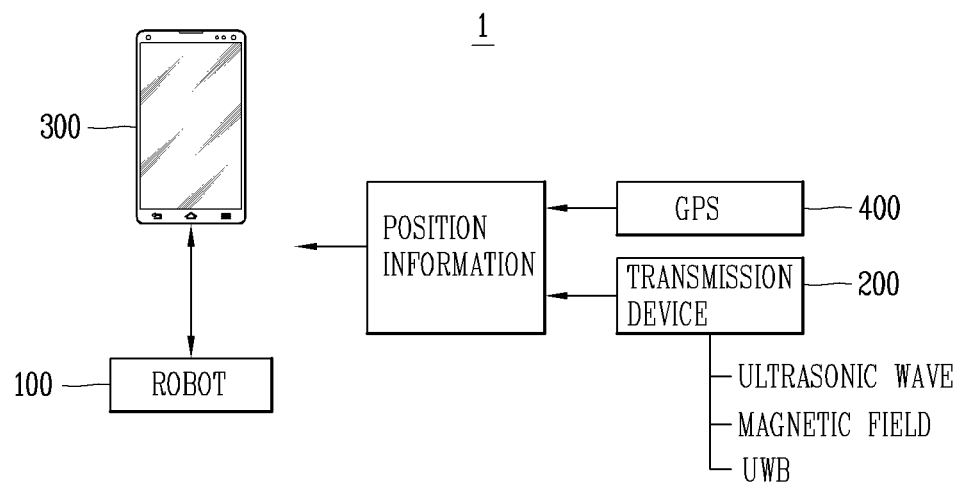
FIG. 1B is a conceptual view illustrating a signal flow between devices to determine a position of a moving robot system.

In the system 1, the robot 100 may operate according to a traveling mechanism (or principle) as shown in FIG. 1A, and a signal may flow between devices for determining a position as shown in FIG. 1B. Accordingly, the robot 100 may travel in a travel area 1000 as illustrated in FIG. 2.

Figure 2:
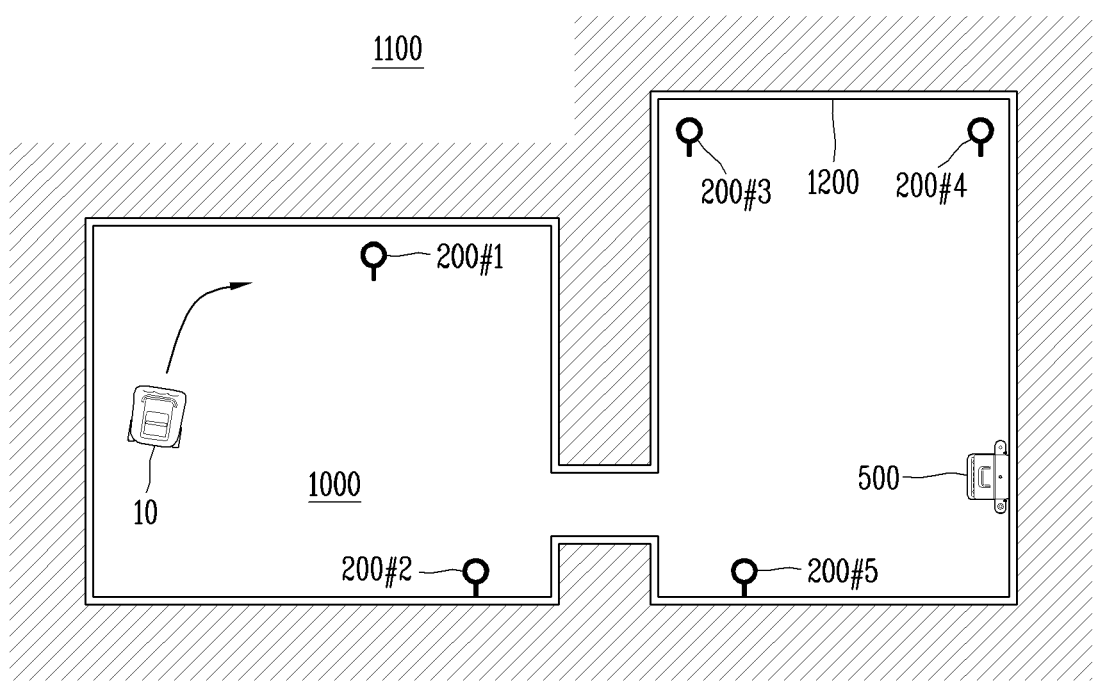
FIG. 2 is a conceptual view illustrating one embodiment of a travel area of a moving robot.

The robot 100 may travel by itself in the travel area 1000 shown in FIG. 2. The robot 100 may perform particular operation during traveling. Here, the particular operation may be cutting a lawn in the travel area 1000. The travel area 1000 is a target area in which the robot 100 is to travel and operate. A predetermined outside/outdoor area may be provided as the travel area 1000. For example, a garden, a yard, or the like in which the robot 100 is to cut a lawn may be provided as the travel area 1000. A charging apparatus 500 for charging the robot 100 with driving power may be installed in the travel area 1000. The robot 100 may be charged with driving power by docking with the charging apparatus 500 installed in the travel area 1000.

The travel area 1000 may be provided as a boundary area 1200 that is predetermined, as shown in FIG. 2. The boundary area 1200 corresponds to a boundary line between the travel area 1000 and an outside area 1100, and the robot 100 may travel within the boundary area 1200 not to deviate from the outside area 1100. In this case, the boundary area 1200 may be formed to have a closed curved shape or a closed-loop shape. The boundary area 1200 may be set based on coordinate information on a map of the travel area 1000. Here, the robot 100 may recognize the boundary area 1200 by recognizing a virtual boundary line based on the coordinate information. Also, the boundary area 1200 may be defined by a wire 1200 formed as a closed curve or a closed loop. Here, the wire 1200 may be installed in an arbitrary area. The robot 100 may travel in the travel area 1000 having a closed curved shape formed by the installed wire 1200.

As shown in FIG. 2, a transmission device 200 may be provided in plurality in the travel area 1000. The transmission device 200 is a signal generation element configured to transmit a signal to determine position (or location) information about the robot 100. The transmission devices 200 may be installed in the travel area 1000 in a distributed manner. The robot 100 may receive signals transmitted from the transmission devices 200 to determine a current position of the robot 100 based on a result of the reception, or to determine position information regarding the travel area 1000. In this case, a receiver of the robot 100 may receive the transmitted signals. The transmission devices 200 may be provided in a periphery of the boundary area 1200 of the travel area 1000. Here, the robot 100 may determine the boundary area 1200 based on installed positions of the transmission devices 200 in the periphery of the boundary area 1200.

As shown in FIG. 1A, the robot 100 may communicate with the terminal 300 moving in a predetermined area, and travel by following a position of the terminal 300 based on data received from the terminal 300. The robot 100 may set a virtual boundary in a predetermined area based on position information received from the terminal 300 or collected while the robot 100 is traveling by following the terminal 300, and set an internal area formed by the virtual boundary as the travel area 1000. When the boundary area 1200 and the travel area 1000 are set, the robot 100 may travel in the travel area 1000 not to deviate from the boundary area 1200. According to cases, the terminal 300 may set the boundary area 1200 and transmit the boundary area 1200 to the robot 100. When the terminal 300 changes or expands an area, the terminal 300 may transmit changed information to the robot 100 so that the robot 100 may travel in a new area. Also, the terminal 300 may display data received from the robot 100 on a screen to monitor operation of the robot 100.

The robot 100 or the terminal 300 may determine a current position by receiving position information. The robot 100 and the terminal 300 may determine a current position based on a signal for position information transmitted from the transmission device 200 in the travel area 1000, a global positioning system (GPS) signal obtained using the GPS satellite 400, or data received from the web server 600. The robot 100 and the terminal 300 may preferably determine a current position by receiving signals transmitted from three transmission devices 200 and comparing the signals with each other. That is, three or more transmission devices 200 may be preferably provided in the travel area 1000.

The robot 100 sets one specific point in the travel area 1000 as a reference position, and then calculates a position while the robot 100 is moving as a coordinate. For example, an initial starting position, that is, a position of the charging apparatus 500 may be set as a reference position. Alternatively, a position of one of the plurality of transmission devices 200 may be set as a reference position to calculate a coordinate in the travel area 1000. The robot 100 may set an initial position of the robot 100 as a reference position in each operation, and then determine a position of the robot 100 while the robot 100 is traveling. With respect to the reference position, the robot 100 may calculate a traveling distance based on rotation times and a rotational speed of a driving wheel, a rotation direction of a main body, etc. to thereby determine a current position in the travel area 1000. Even when the robot 100 determines a position of the robot 100 using the GPS satellite 400, the robot 100 may determine the position using a specific point as a reference position.

As shown in FIG. 1B, the robot 100 may determine a current position based on position information transmitted from the transmission device 200 or the GPS satellite 400. The position information may be transmitted in the form of a GPS signal, an ultrasound signal, an infrared signal, an electromagnetic signal, or an ultra-wideband (UWB) signal. A signal transmitted from the transmission device 200 may preferably be a UWB signal. Accordingly, the robot 100 may receive the UWB signal transmitted from the transmission device 200, and determine a current position based on the UWB signal.

Figure 3A:
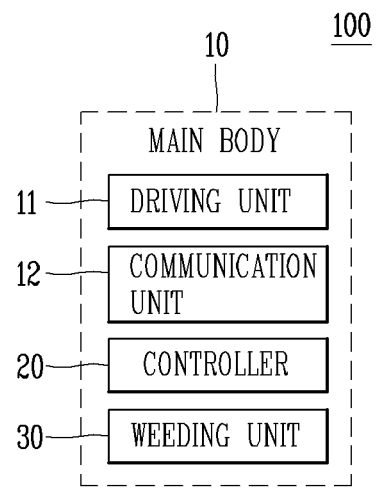
FIG. 3A is a configuration diagram (a) of a moving robot according to an embodiment.

As illustrated in FIG. 3A, the robot 100 that cuts a lawn while traveling in the travel area 1000 may include a main body 10, a driving unit 11 moving the main body 10, a communication unit 12 communicating with a communication target element of the robot 100, a weeding unit 30 cutting a lawn while traveling, and a controller 20 controlling traveling and cutting operation of the robot 100 by controlling the driving unit 11, the communication unit 12, and the weeding unit 30.

Figure 3B:
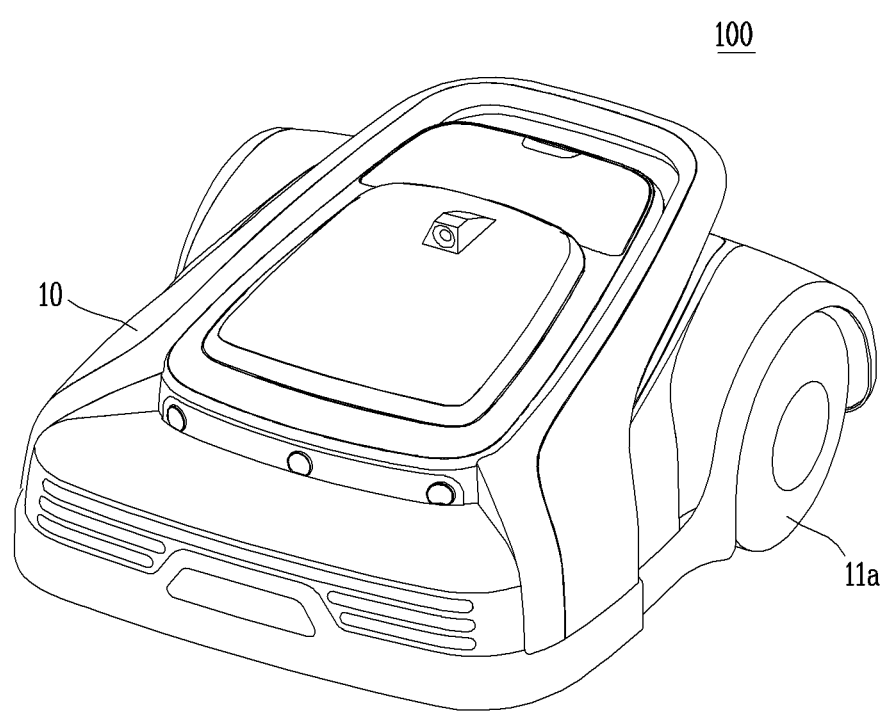
FIG. 3B is a configuration diagram (b) of a moving robot according to an embodiment.
Figure 3C:
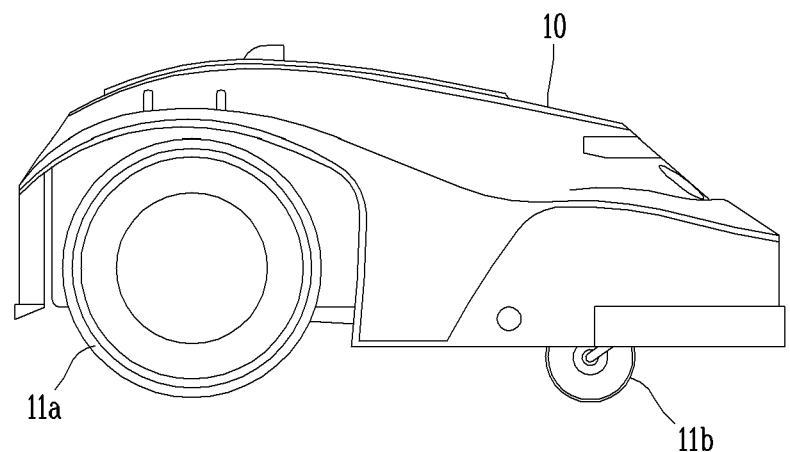
FIG. 3C is a configuration diagram (c) of a moving robot according to an embodiment.

As shown in FIGS. 3B and 3C, the robot 100 may be an autonomous traveling robot including the main body 10 configured to be movable so as to cut a lawn. The main body 10 forms an outer shape (or appearance) of the robot 100 and includes one or more elements performing operation such as traveling of the robot 100 and cutting of a lawn. The main body 10 includes the driving unit 11 that may move the main body 10 in a desired direction and rotate the main body 10. The driving unit 11 may include a plurality of rotatable driving wheels. Each of the driving wheels may individually rotate so that the main body 10 rotates in a desired direction. In detail, the driving unit 11 may include at least one main driving wheel 11a and an auxiliary wheel 11b. For example, the main body 10 may include two main driving wheels 11a, and the two main driving wheels may be installed at a rear lower surface of the main body 10.

In the robot 100, the controller 20 may control traveling and lawn mowing of the robot 100 by determining a current position of the main body 10 so as to travel in the travel area 1000, and controlling the weeding unit 30 to cut a lawn while the main body 10 is traveling in the travel area 1000.

Figure 4:
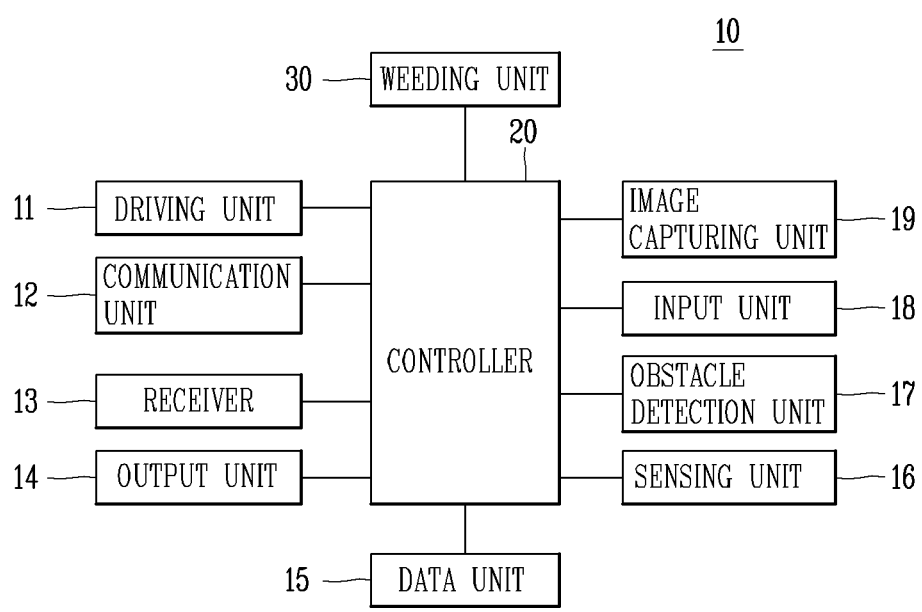
FIG. 4 is a detailed configuration diagram of a moving robot.

Referring to FIG. 4, the robot 100 operating as described above may include the main body 10, the driving unit 11, the communication unit 12, the weeding unit 30, and the controller 20, so as to cut a lawn while traveling in the travel area 1000. Also, the robot 100 may further include at least one selected from a receiver 13, an output unit 14, a data unit 15, a sensing unit 16, an image capturing unit 17, an input unit 18, and an obstacle detection unit 19.

The driving unit 11 is a driving wheel provided at a lower portion of the main body 10, and may be rotationally driven to move the main body 10. That is, the driving unit 11 may be driven such that the main body 10 travels in the travel area 1000. The driving unit 11 may include at least one driving motor to move the main body 10 so that the robot 100 travels. For example, the driving unit 11 may include a left wheel driving motor for rotating a left wheel and a right wheel driving motor for rotating a right wheel.

The driving unit 11 may transmit information about a driving result to the controller 20, and receive a control command for operation from the controller 20. The driving unit 11 may operate according to the control command received from the controller 20. That is, the driving unit 11 may be controlled by the controller 20.

The communication unit 12 may communicate with at least one communication target element with which communicates the robot 100. The communication unit 12 may communicate with at least one communication target element using a wireless communication method. The communication unit 12 may communicate with the transmission device 200, In addition, the communication unit 12 may be connected to a predetermined network so as to communicate with the web server 600 or with the terminal 300 that controls the robot 100. Here, communication with the web server 600 may be performed by the terminal 300, or the communication unit 12 and the web server 600 may directly communicate with each other. When the communication unit 12 communicates with the terminal 300, the communication unit 13 may transmit a generated map to the terminal 300, receive a command from the terminal 300, and transmit data regarding an operation state of the robot 100 to the terminal 300. The communication unit 12 may include a communication module such as wireless fidelity (Wi-Fi), wireless broadband (WiBro), or the like, as well as a short-range wireless communication module such as Zigbee, Bluetooth, or the like, to transmit and receive data.

The communication unit 12 may transmit information about a result of the communication to the controller 20, and receive a control command for operation from the controller 20. The communication unit 12 may operate according to the control command received from the controller 20. That is, the communication unit 12 may be controlled by the controller 20.

The receiver 13 may include a plurality of signal sensor modules that transmits and receives position information. The receiver 13 may include a position sensor module that receives signals transmitted from the transmission device 200. The position sensor module may transmit a signal to the transmission device 200. When the transmission device 200 transmits a signal using a method selected from an ultrasound method, a UWB method, and an infrared method, the receiver 13 may include a sensor module that transmits and receives an ultrasound signal, a UWB signal, or an infrared signal, in correspondence with this. The receiver 13 may include a UWB sensor. As a reference, UWB radio technology refers to a technology using a very wide frequency range of several GHz or more in baseband instead of using a radio frequency (RF) carrier. The UWB radio technology uses very narrow pulses of several nanoseconds or several picoseconds. Since pulses emitted from such a UWB sensor are several nanoseconds or several picoseconds long, the pulses have good penetrability. Thus, even when there are obstacles in a periphery of the UWB sensor, the receiver 17 may receive very short pulses emitted by other UWB sensors.

When the robot 100 travels by following the terminal 300, the terminal 300 and the robot 100 include the UWB sensor, respectively, thereby transmitting or receiving a UWB signal with each other through the UWB sensor. The terminal 300 may transmit the UWB signal to the robot 100 through the UWB sensor included in the terminal 300. The robot 100 may determine a position of the terminal 300 based on the UWB signal received through the UWB sensor, allowing the robot 100 to move by following the terminal 300. In this case, the terminal 300 operates as a transmitting side, and the robot 100 operates as a receiving side. When the transmission device 200 includes the UWB sensor and transmits a signal, the robot 100 or the terminal 300 may receive the signal transmitted from the transmission device 200 through the UWB sensor included in the robot 100 or the terminal 300. At this time, a signaling method performed by the transmission device 200 may be identical to or different from signaling methods performed by the robot 100 and the terminal 300.

The receiver 13 may include a plurality of UWB sensors. When two UWB sensors are included in the receiver 17, for example, provided on left and right sides of the main body 10, respectively, the two USB sensors may receive signals, respectively, and compare a plurality of received signals with each other to thereby calculate an accurate position. For example, according to a position of the robot 100, the transmission device 200, or the terminal 300, when a distance measured by a left sensor is different from a distance measured by a right sensor, a relative position between the robot 100 and the transmission device 200 or the terminal 300, and a direction of the robot 100 may be determined based on the measured distances.

The receiver 13 may further include a GPS module for transmitting and receiving a GPS signal to and from the GPS satellite 400. The receiver 13 may transmit the reception result of the signal to the controller 20, and receive a control command for operation from the controller 20. The receiver 13 may operate according to the control command received from the controller 20. That is, the receiver 13 may be controlled by the controller 20.

The output unit 14 may include an output element such as a speaker to output an operation state of the robot 100 in a form of a voice (or audio). The output unit 14 may output an alarm when an event occurs while the robot 100 is moving. For example, when the power is run out, an impact or shock is applied to the robot 100, or an accident occurs in the travel area 1000, an alarm voice may be output so that corresponding information is provided to a user.

The output unit 14 may transmit information about an operation state to the controller 20 and receive a control command for operation from the controller 20. The output unit 14 may operate according to a control command received from the controller 20. That is, the output unit 14 may be controlled by the controller 20.

The data unit 15 is a storage element that stores data readable by a microprocessor, and may include a hard disk drive (HDD), a solid state disk (SSD), a silicon disk drive (SDD), a read only memory (ROM) a random access memory (RAM), CD-ROM, a magnetic tape, a floppy disk, or an optical data storage device. In the data unit 15, a received signal, reference data to determine an obstacle, and obstacle information regarding a detected obstacle may be stored. In addition, control data that controls operation of the robot 100, data according to an operation mode of the robot 100, position information collected, and information about the travel area 1000 and the boundary area 1200 may be stored in the data unit 15.

The sensing unit 16 may include at least one sensor that senses information about a posture and operation of the main body 10. The sensing unit 16 may include at least one selected from an inclination sensor that detects movement of the main body 10 and a speed sensor that detects a driving speed of the driving unit 11. The inclination sensor may be a sensor that senses posture information about the main body 10. When the main body 10 is inclined forward, backward, leftward or rightward, the inclination sensor may sense the posture information about the main body 10 by calculating an inclined direction and an inclination angle. A tilt sensor, an acceleration sensor, or the like may be used as the inclination sensor. In the case of the acceleration sensor, any of a gyro type sensor, an inertial type sensor, and a silicon semiconductor type sensor may be used. In addition, various sensors or devices capable of detecting movement of the main body 10 may be used. The speed sensor may be a sensor for sensing a driving speed of a driving wheel provided in the driving unit 11. When the driving wheel rotates, the speed sensor may sense the driving speed by detecting rotation of the driving wheel.

The sensing unit 16 may transmit information about a sensing result to the controller 20, and receive a control command for operation from the controller 20. The sensing unit 16 may operate according to a control command received from the controller 20. That is, the sensing unit 16 may be controlled by the controller 20.

The image capturing unit 17 may be a camera capturing an image of a periphery of the main body 10 to generate image information about the travel area 1000 of the main body 10. The image capturing unit 17 may capture an image of a forward direction of the main body 10 to detect an obstacle around the main body 10 and in the travel area 1000. The image capturing unit 17 may capture an image of a forward direction of the main body 10 to detect an obstacle around the main body 10 and in the travel area 1000. The image capturing unit 17 is a digital camera, which may include an image sensor (not shown) and an image processing unit (not shown). The image sensor is a device that converts an optical image into an electrical signal. The image sensor includes a chip in which a plurality of photodiodes is integrated. A pixel may be an example of a photodiode. Electric charges are accumulated in the respective pixels by an image, which is formed on the chip by light that has passed through a lens, and the electric charges accumulated in the pixels are converted to an electrical signal (for example, a voltage). A charge-coupled device (CCD) sensor and a complementary metal oxide semiconductor (CMOS) sensor are well known as image sensors. In addition, the camera may include a digital signal processor (DSP) for processing a captured image to generate the image information.

The image capturing unit 17 may transmit information about a result of the image capturing to the controller 20, and receive a control command for operation from the controller 20. The image capturing unit 17 may operate according to the control command received from the controller 20. That is, the image capturing unit 17 may be controlled by the controller 20.

The input unit 18 may include at least one input element such as a button, a switch, a touch pad, or the like, and an output element such as a display, or the like to receive a user command and output an operation state of the robot 100. For example, a command for performing a monitoring mode may be input and a state for performing the monitoring mode may be output via the display.

The input unit 18 may display a state (or status) of the robot 100 through the display, and display a control screen on which manipulation or an input is applied for controlling the robot 100. The control screen may refer to a user interface screen on which a driving state of the robot 100 is displayed, and a command for driving manipulation of the robot 100 is input from a user. The control screen may be displayed on the display under the control of the controller 20, and a display and an input command on the control screen may be controlled by the controller 20.

The input unit 18 may transmit information about an operation state to the controller 20 and receive a control command for operation from the controller 20. The input unit 18 may operate according to a control command received from the controller 20. That is, the input unit 18 may be controlled by the controller 20.

The obstacle detection unit 19 includes a plurality of sensors to detect obstacles located in a traveling direction. The obstacle detection unit 19 may detect an obstacle located in a forward direction of the main body 10, that is, in a traveling direction of the main body 10 using at least one selected from a laser sensor, an ultrasonic sensor, an infrared sensor, and a three-dimensional (3D) sensor. The obstacle detection unit 19 may further include a cliff detection sensor installed on a rear surface of the main body 10 to detect a cliff.

The obstacle detection unit 19 may transmit information about a result of the detection to the controller 20, and receive a control command for operation from the controller 20. The obstacle detection unit 19 may operate according to the control command received from the controller 20. That is, the obstacle detection unit 19 may be controlled by the controller 20.

The weeding unit 30 cuts a lawn while traveling. The weeding unit 30 is provided with a brush or blade for cutting a lawn, so as to cut the lawn in a rotating manner.

The weeding unit 30 may transmit information about a result of operation to the controller 20 and receive a control command for operation from the controller 20. The weeding unit 30 may operate according to the control command received from the controller 20. That is, the weeding unit 30 may be controlled by the controller 20.

The controller 20 may include a central processing unit to control all operations of the robot 100. The controller 20 may determine a condition of the travel area 1000 while traveling in the travel area 1000, via the main body 10, the driving unit 11, and the image capturing unit 17 to control traveling of the main body 10, and control functions and operations of the robot 100 to be performed via the communication unit 12, the receiver 13, the output unit 14, the data unit 15, the sensing unit 16, the input unit 18, the obstacle detection unit 19, and the weeding unit 30.

The controller 20 may control input and output of data, and control the driving unit 11 so that the main body 10 travels according to settings. The controller 20 may independently control operations of the left wheel driving motor and the right wheel driving motor by controlling the driving unit 11 to thereby control the main body 10 to travel rotationally or in a straight line.

The controller 20 may set the boundary area 1200 based on position information received from the terminal 300 or the web server 600, and position information determined based on at least one of the signals received from the transmission device 200. The controller 20 may also set the boundary area 1200 based on position information that is collected by the controller 20 during traveling. The controller 20 may set a specific area in a region defined by the set boundary area 1200 as the travel area 1000. The controller 20 may set the boundary area 1200 in a closed loop form by connecting discontinuous position information in a line or a curve, and set an inner area within the boundary area 1200 as the travel area 1000. When the travel area 1000 and the boundary area 1200 corresponding thereto are set, the controller 20 may control traveling of the main body 10 so that the main body 10 travels in the travel area 1000 without deviating from the set boundary area 1200. The controller 20 may determine a current position based on received position information and control the driving unit 11 so that the determined current position is located in the travel area 1000 to thereby control traveling of the main body 10.

In addition, according to obstacle information input by at least one of the image capturing unit 17 and the obstacle detection unit 19, the controller 20 may control the main body 10 to travel while avoiding obstacles. In this case, the controller 20 may modify the travel area 1000 by reflecting the obstacle information in pre-stored area information regarding the travel area 1000.

The robot 100 may travel in the travel area 1000 based on information according to the boundary area 1200 set at initial setting for traveling in the travel area 1000. Here, the boundary area 1200 may be set based on a reception result of the signals transmitted from the transmission device 200 while the robot 100 autonomously travels in the travel area 1000, or may be set through communication between the robot 100 and the terminal 300.

Figure 5:
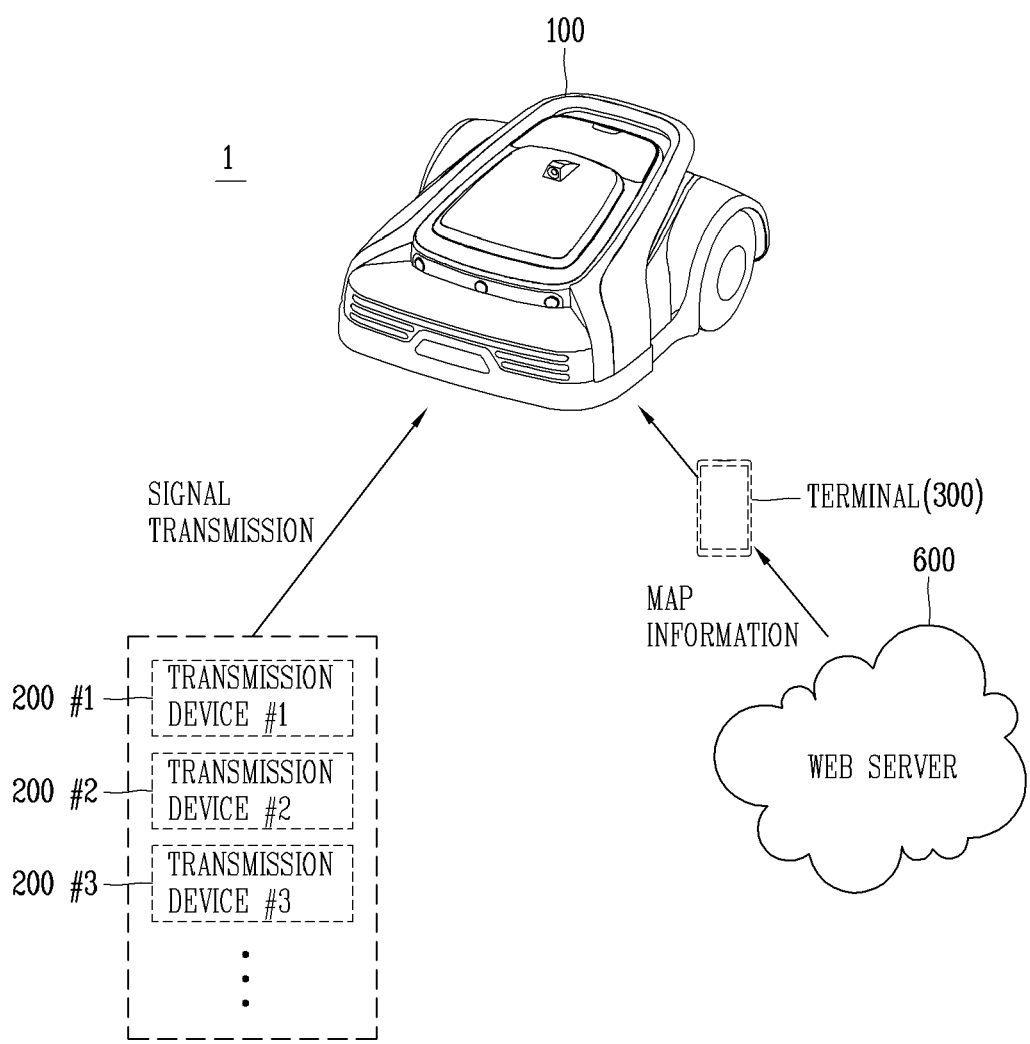
FIG. 5 is a configuration diagram of a moving robot system disclosed in this specification.
Figure 6:
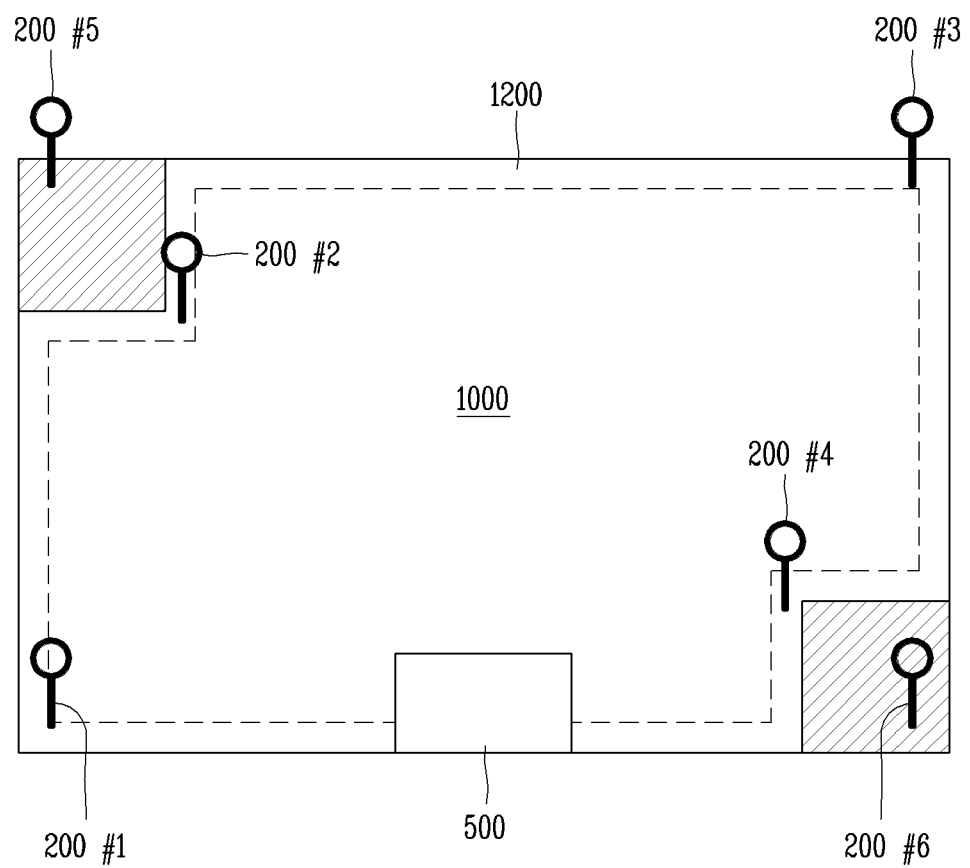
FIG. 6 is an exemplary view illustrating an example of a travel area of the moving robot system disclosed in this specification.

The system 1 is a system in which the boundary area 1200 is set, and includes the plurality of transmission devices 200, the terminal 300, and the robot 100, as illustrated in FIG. 5. That is, the system 1 is a moving robot system including the plurality of transmission devices 200, the terminal 300, and the robot 100, and is configured to generate boundary information about the boundary area 1200 in the travel area 1000 as illustrated in FIG. 6 to set the boundary area 1200. Here, the terminal 300 may communicate with the web server 600 that provides information about the travel area 1000. That is, the system 1 may further include the web server 600.

In the system 1, the plurality of transmission devices 200 is installed in the boundary area 1200 of the travel area 1000 to transmit signals. The plurality of transmission devices 200 may be installed in the boundary area 1200 in a distributed manner. For example, as illustrated in FIG. 6, the plurality of transmission devices 200 may be installed at each corner portion of the boundary area 1200. At least three of the plurality of transmission devices 200 are preferably installed in the boundary area 1200 in a distributed manner, so that each of the plurality of transmission devices 200 transmits a signal from its position. As illustrated in FIG. 6, the plurality of transmission devices 200 installed in the boundary area 1200 in a distributed manner each may transmit a signal that is a basis for determining a position of the robot 100 and setting the boundary area 1200. The signal transmitted from each of the plurality of transmission devices 200 may be received by the robot 100 and the terminal 300.

In the system 1, the web server 600 provides a communication target device with map information about an area including the travel area 1000. Here, the communication target device may be the robot 100 or the terminal 300. The web server 600 may be connected to at least one server on the Internet web to share information by transmitting and receiving data to and from the connected server. In addition, the web server 600 may also share information shared with the server with the communication target device. The web server 600 may directly communicate with the robot 100 or may communicate with the robot 100 by communicating with the terminal 300 that communicates with the robot 100. The web server 600 may store control information related to controlling of the system 1. For example, the web server 600 may store data related to an application of the robot 100 or the terminal 300, or data related to an operation history of the robot 100. Accordingly, remote control of the system 1 may be performed through the web server 600. The web server 600 as described above may be an application server of the robot 100. The web server 600 may provide at least one of the robot 100 and the terminal 300 with the map information including the travel area 1000. Here, the map information may be a commercial map provided on the web, for example, a Google map. The map information may be provided in a form of a CAD drawing, and the robot 100 may determine at least one of position, topography, feature, area, orientation, and actual measurement of the travel area 1000 using the map information. In addition, the web server 600 may receive information about a current position of the robot 100 from the GPS satellite 400.

In the system 1, the terminal 300 displays a control screen including information related to the travel area 1000. Here, the control screen may refer to a screen that is output on the display of the terminal 300. For example, the control screen may be an interface screen of an application that remotely controls the robot 100. On the control screen, a map of the travel area 1000 may be displayed so that a setting of the travel area 1000 and a manipulation for travel control are inputted. The terminal 300 communicates with the robot 100 and the web server 600 to share information about the control of the system 1 with the robot 100 and the web server 600. Accordingly, the terminal 300 may control the robot 100 to travel according to the manipulation on the control screen by transmitting a control command corresponding to the manipulation on the control screen to the robot 100. The terminal 300 may set the boundary area 1200 through the control screen. For example, by displaying a screen for setting the boundary area 1200 on the control screen, the boundary area 1200 may be set corresponding to the manipulation on the control screen.

In the system 1, the robot 100 operates by determining a position of the robot 100 on the travel area 1000 based on a reception result of the transmitted signal, in response to the manipulation on the control screen. That is, the robot 100 may travel in the travel area 1000 by determining a position of the robot 100 on the travel area 1000 based on the signals received from the plurality of transmission devices 200 according to the manipulation on the control screen of the terminal 300. The robot 100 may determine positions of the plurality of transmission devices 200 by receiving the signals from the plurality of transmission devices 200 to determine positions on the travel area 1000. The robot 100 may transmit information about a current position to the terminal 300 while communicating with the terminal 300. Accordingly, position information about the robot 100 and the plurality of transmission devices 200 may be displayed on the control screen of the terminal 300.

Figure 7:
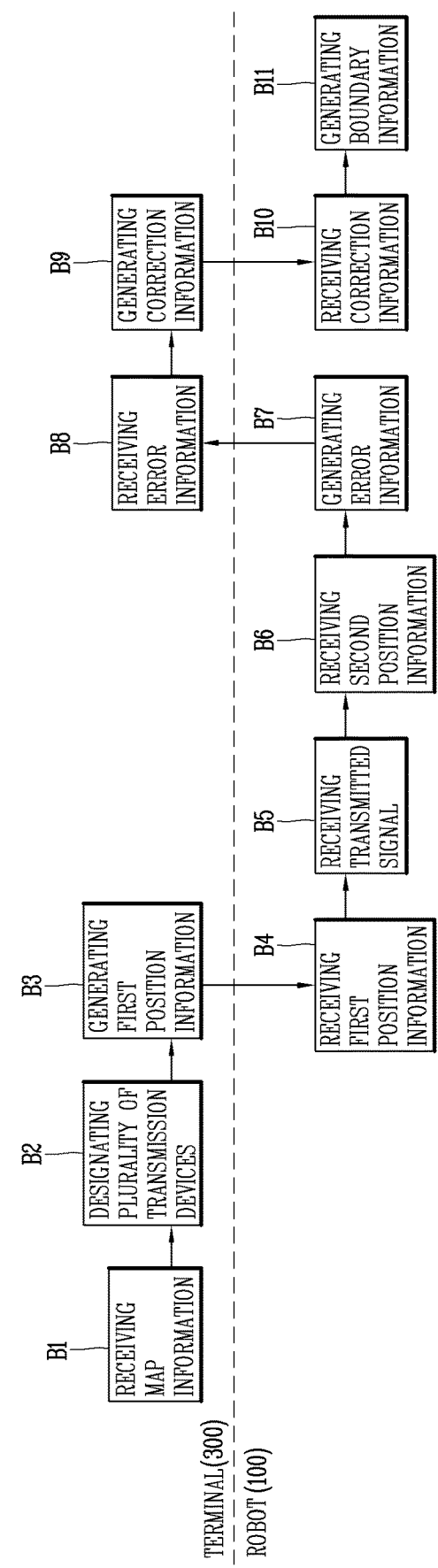
FIG. 7 is a block diagram showing a process of generating boundary information of the moving robot system disclosed in this specification.

In the system 1, boundary information about the boundary area 1200 may be generated by the robot 100 according to a process shown in FIG. 7, in a state in which the plurality of transmission devices 200 is installed in a distributed manner in the boundary area 1200 according to the map information about the travel area 1000. The terminal 300 receives map information about an area corresponding to the travel area 1000 from the web server 600 [B1] to display the map information on the control screen, generates first position information [B3] in response to a manipulation in which positions of the plurality of transmission devices 200 are designated [B2], and transmits the first position information to the robot 1000 [B4].

Figure 8A:
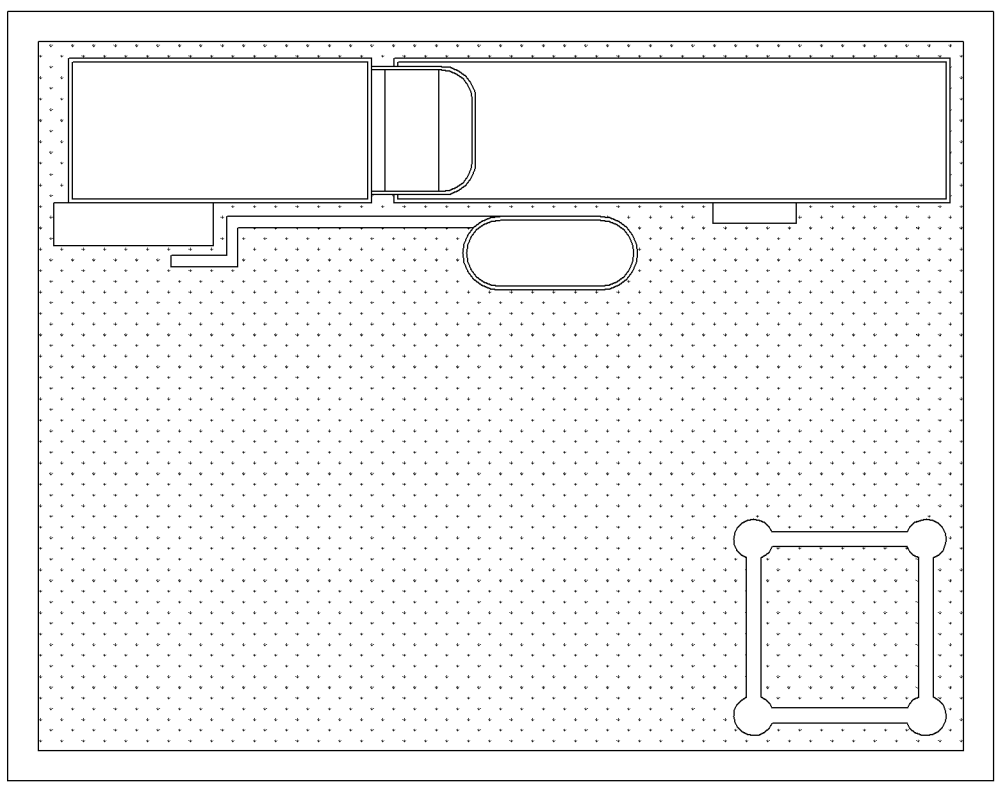
FIG. 8A is an exemplary view of map information corresponding to a travel area of the moving robot system disclosed in this specification.
Figure 8B:
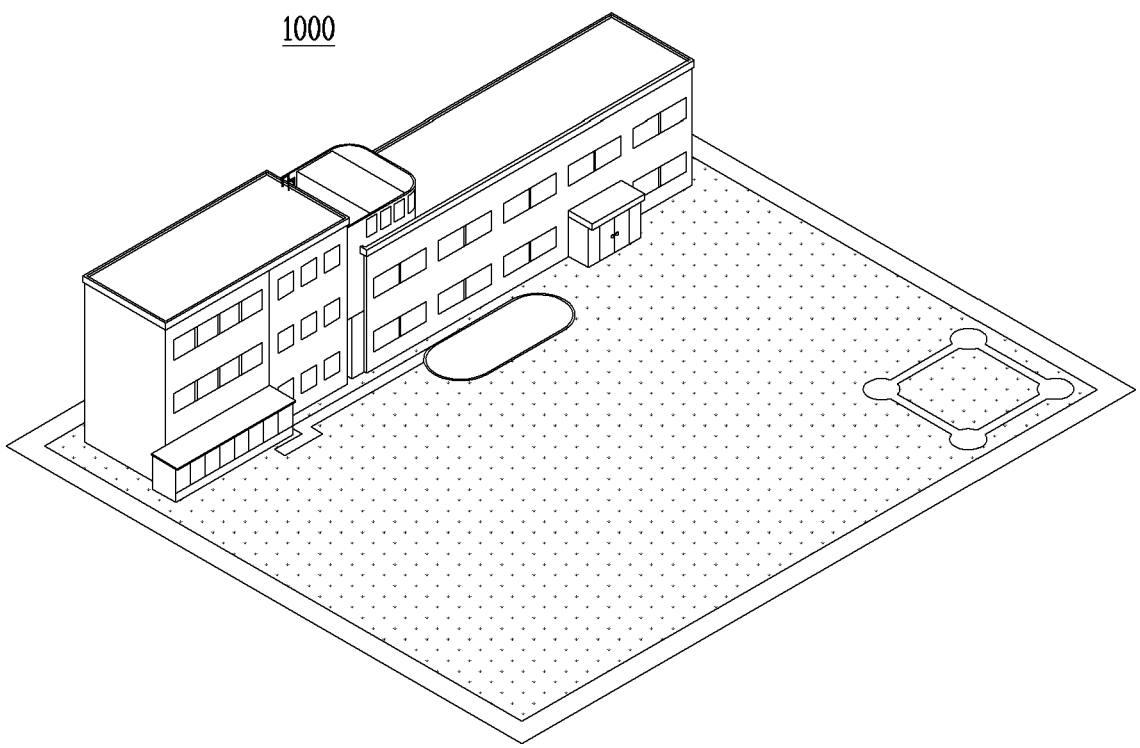
FIG. 8B is an exemplary view of an actual environment of a travel area corresponding to the map information illustrated in FIG. 8A.

The map information relates to an area corresponding to the travel area 1000 in map information stored in the web server 600, and may be actual map information about the travel area 1000. In addition, the map information may be information according to actual topography and feature on the travel area 1000. For example, when the travel area 1000 is as illustrated in FIG. 8B, the map information GM may be as illustrated in FIG. 8A.

The terminal 300, before the plurality of transmission devices 200 is installed, may receive the map information GM from the web server 600 [B1] to display the map information on the control screen. That is, the terminal 300 may receive the map information GM from the web server 600 [B1], before the plurality of transmission devices 200 is installed in the boundary area 1200 in a distributed manner. Here, the web server 600 may recognize position information about an area corresponding to the travel area 1000 to transmit the map information GM corresponding to the travel area 1000 to the terminal 300. In addition, the web server 600 may receive position information about an area corresponding to the travel area 1000 from the terminal 300 to transmit the map information GM corresponding to the travel area 1000 to the terminal 300.

After receiving the map information GM from the web server 600 [B1], the terminal 300 may display the map information GM on the control screen so that the boundary area 1200 is set according to the map information GM. The terminal 300 may display the map information GM on the control screen to generate the first position information [B3] in respond to a manipulation in which positions of the plurality of transmission devices 200 are designated on the map information GM [B2]. The first position information may be data on position information about the plurality of transmission devices 200. The first position information may be information about virtual positions of the plurality of transmission devices 200 designated on the map information GM. That is, the first position information may be generated according to a virtual designation of the positions of the plurality of transmission devices 200 in the map information GM. For example, when positions of the plurality of transmission devices 200 are designated as illustrated in FIG. 9 on a map screen GM as illustrated in FIG. 8A, the terminal 300 may generate the first position information according to the designated positions.

Here, a manipulation for setting specific zones SZ#1 and SZ#2 in the travel area 1000 may be performed on the map screen GM, and the terminal 300 may accordingly set the specific zones SZ#1 and SZ#2. As the first position information is generated, a user of the terminal 300 may install the plurality of transmission devices 200 in the boundary area 1200 as illustrated in FIG. 10 according to the first position information as illustrated in FIG. 9. Here, specific zones SZ#1 and SZ#2 in the travel area 1000 may be set on the map screen GM, and the terminal 300 may accordingly set the specific zones SZ#1 and SZ#2.

Figure 9:
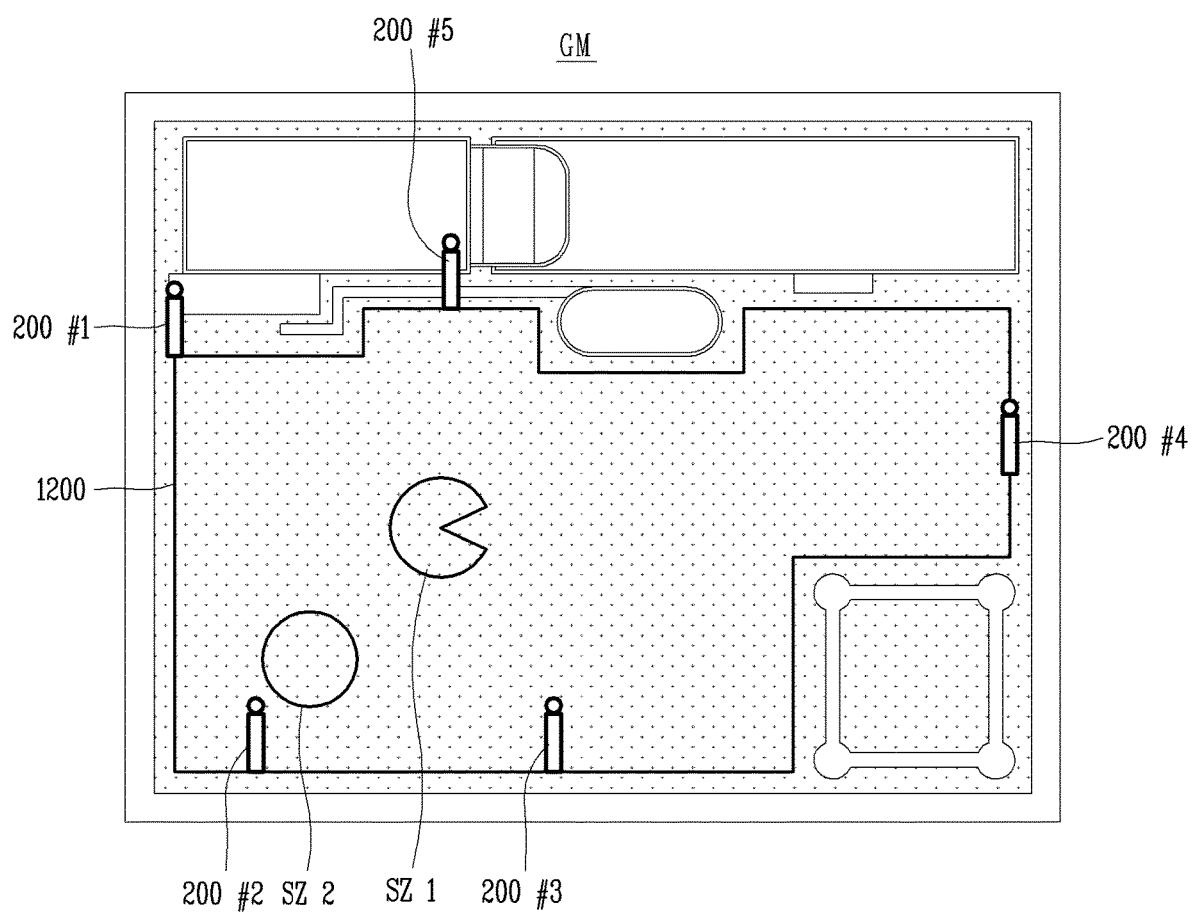
FIG. 9 is an exemplary view explaining an example of generating first position information of the moving robot system disclosed in this specification.
Figure 10:
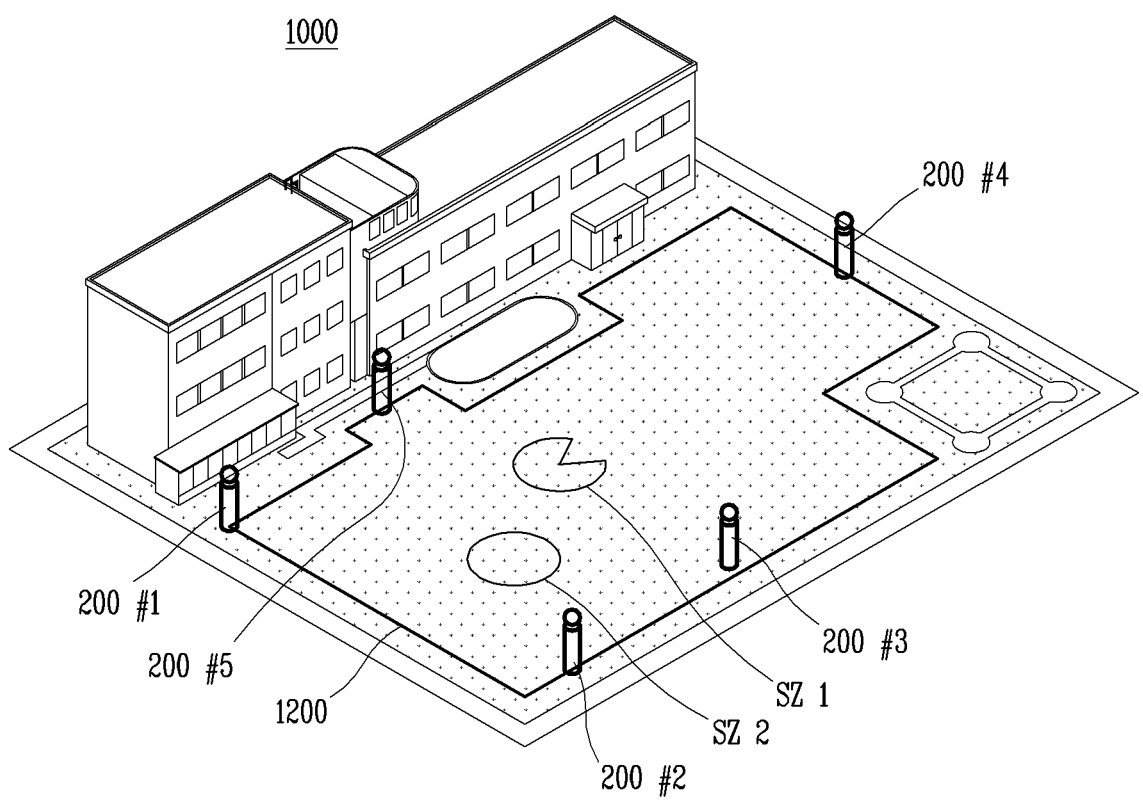
FIG. 10 is an exemplary view of a predicted installation of a plurality of transmission devices according to the exemplary view in FIG. 9.

As illustrated in FIG. 9, the terminal 300 may generate the first position information in respond to a manipulation in which positions of the plurality of transmission devices 200 are designated on the map information GM to transmit the first position information to the robot 100 [B4]. Accordingly, the first position information may be shared with the robot 100.

In a state in which the plurality of transmission devices 200 is installed at positions as designated on the map information GM, the robot 100 generates second position information based on a reception result of the transmitted signal to generate the boundary information about the travel area 1000 based on the first position information and the second position information [B5 to B11].

Figure 11:
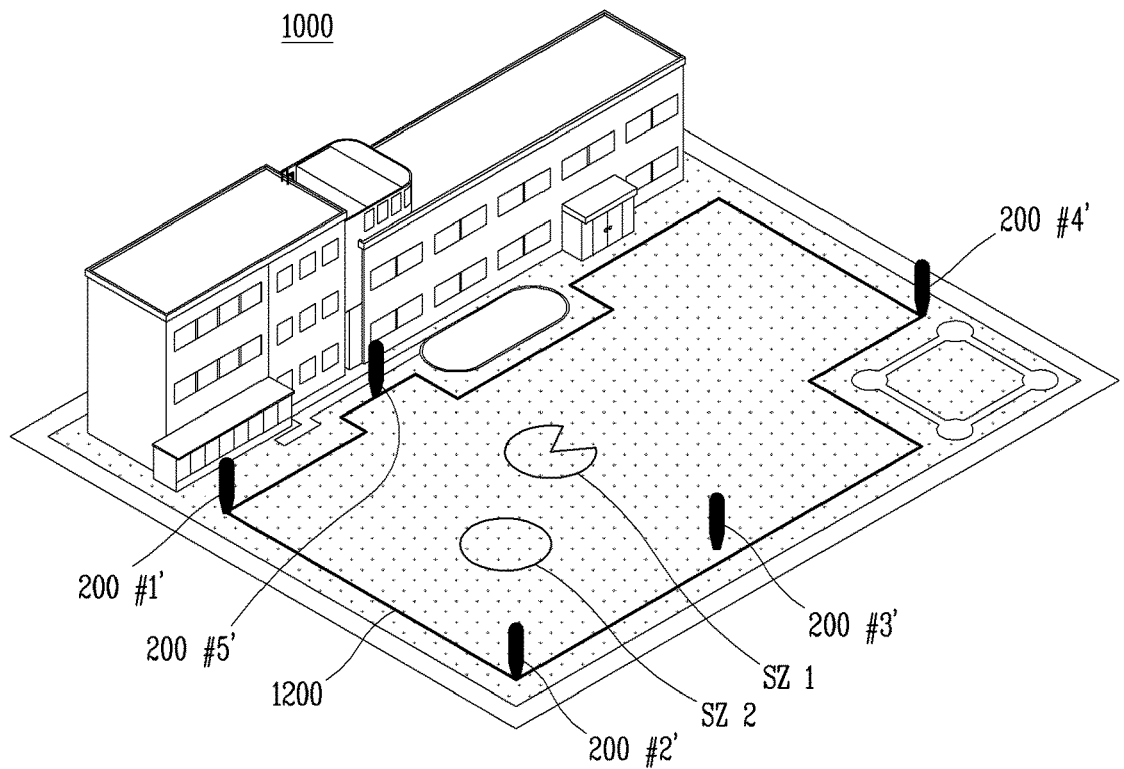
FIG. 11 is an exemplary view of an actual installation of the plurality of transmission devices according to the exemplary view in FIG. 9.

After receiving the first position information from the terminal 300 [B4], the robot 100 may receive signals [B5] in a state in which the plurality of transmission devices 200 is installed at positions according to the first position information as illustrated in FIG. 11, to generate the second position information [B6]. The second position information may be data on position information about the plurality of transmission devices 200. The second position information may be information about positions of the plurality of transmission devices 200 installed according to positions designated on the map. That is, the second position information may be generated according to an actual installation of the plurality of transmission devices 200 in the travel area 1000. For example, when each of the plurality of transmission devices 200 is installed as illustrated in FIG. 11 according to the first position information about the virtual positions of the plurality of transmission devices 200, the robot 100 may receive signals from each of the plurality of transmission devices [B5] to generate the second position information [B6].

As illustrated in FIG. 11, the robot 100 may generate the second position information according to actual positions where the plurality of transmission devices 200 is installed [B6] to generate the boundary information based on the first position information and the second position information [B7 to B11]. Here, the boundary information may refer to virtual boundary information set as the boundary area 1200. Accordingly, the robot 100 may travel in the travel area 1000 after the boundary area 1200 is set according to the boundary information. The boundary information may be coordinate information about a portion corresponding to the boundary area 1200 in coordinate information based on a specific point on the travel area 1000.

Figure 12:
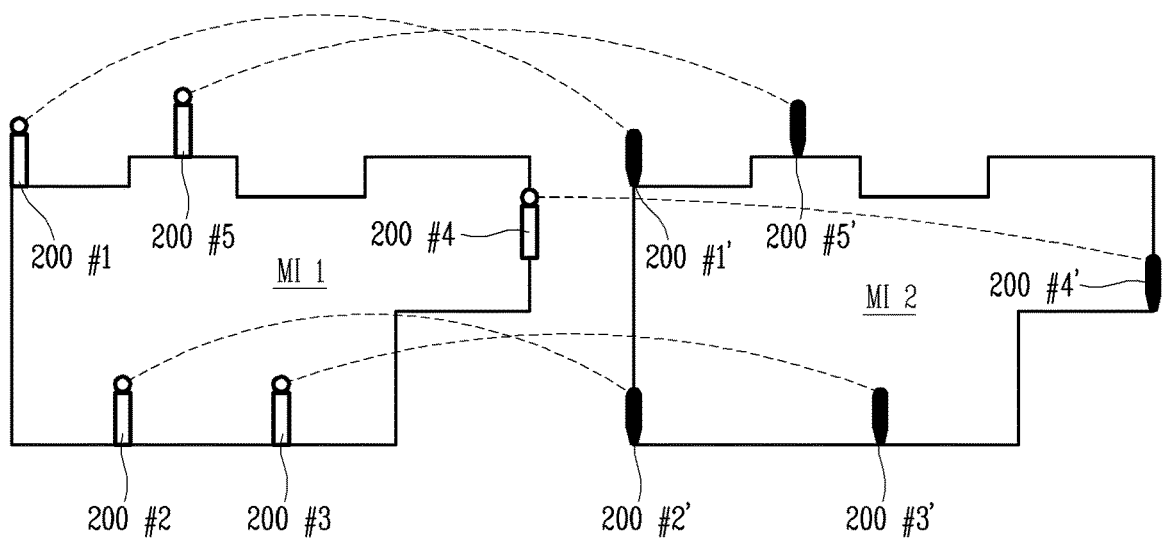
FIG. 12 is an exemplary view illustrating a concept of matching of first position information with second position information of the moving robot system disclosed in this specification.

The robot 100 may generate the boundary information [B7 to B11] by using a result of matching of the first position information according to the virtual positions of the plurality of transmission device 200 with the second position information according to the installation positions of the plurality of transmission devices 200. That is, as illustrated in FIG. 12, the robot 100 may match the first position information MI1 generated as illustrated in FIG. 10 with the second position information MI2 generated as illustrated in FIG. 11 to generate the boundary information [B7 to B11]. Here, the first position information MI1 may be matched with the second position information MI2, based on coordinate information about each of the plurality of transmission devices 200 according to the first position information MI1 and coordinate information about each of the plurality of transmission devices 200 according to the second position information MI2.

The robot 100 may generate error information between the first position information MI1 and the second position information MI2 based on the result of matching of the first position information MI1 with the second position information MI2 [B7], transmit the error information to the terminal 300 [B8], and then receive correction information for the error information from the terminal 300 [B9 and B10] to generate the boundary information based on the correction information [B11].

The robot 100 may match the first position information MI1 with the second position information MI2 according to a preset matching process, and then calculate a position error between the first position information MI1 and the second position information MI2 from the result of the matching to generate the error information [B7]. For example, as illustrated in FIG. 12, the error information may be generated [B7] by calculating a position error between the first position information MI1 and the second position information MI2 after relations between the first position information MI1 and the second position information MI2 are calculated by matching virtual positions 200#1 to 200#5 of each of the plurality of transmission devices 200 on the first position information MI1 with installation positions 200#1' to 200#5' of each of the plurality of transmission devices 200 on the second position information MI2. Here, the matching process may be a process of matching position information about each of the plurality of transmission devices 200 on the first position information MI1 and position information about each of the plurality of transmission devices 200 on the second position information MI2 into one position information. An example of the matching process may be an iterative closest point (ICP) matching technique. That is, the robot 100 may match the first position information MI1 with the second position information MI2 according to the ICP matching technique. The robot 100 may generate the error information [B7] by the process, and then transmit the error information to the terminal 300 [B8]. In a case of an example as illustrated in FIG. 12, since a second transmission device 200#2 and a fourth transmission device 200#4 are installed inconsistent with first position information MI1 to generate errors between the virtual positions 200#2 and 200#4 and the installation positions 200#2' and 200#4', the error information may be generated accordingly [B7].

The terminal 300 may receive the error information [B8] to display the map information GM including the error information and the first position information MI1 on the control screen, and then generate correction information [B9] in respond to a manipulation for correcting the positions of the plurality of transmission devices 200 on the map information GM according to the error information to transmit the correction information to the robot 100 [B10]. In other words, the terminal 300 may display the error information that is a basis in a correction and the first position information MI1 that is a target for the correction on the map information GM, so that positions of the plurality of transmission devices 200 are corrected according to the installation positions of the plurality of transmission devices 200. When the positions of the plurality of transmission devices 200 are corrected on the map information GM after the map information GM including the error information and the first position information MI1 is displayed on the control screen, the terminal 300 may generate correction information in respond to the correction [B9] to transmit the correction information to the robot 100 [B10]. In the case of the example as illustrated in FIG. 12, as the second transmission device 200#2 and the fourth transmission device 200#4 are installed inconsistent with the first position information MI1 to generate errors between the virtual positions 200#2 and 200#4 and the installation positions 200#2' and 200#4', the positions of the second transmission device 200#2 and the fourth transmission device 200#4 are corrected on the first position information MI1 according to the error information, that is, according to the installation positions 200#2' and 200#4' of the second transmission device 200#2 and the fourth transmission device 200#4 to generate the correction information [B9].

Figure 13:
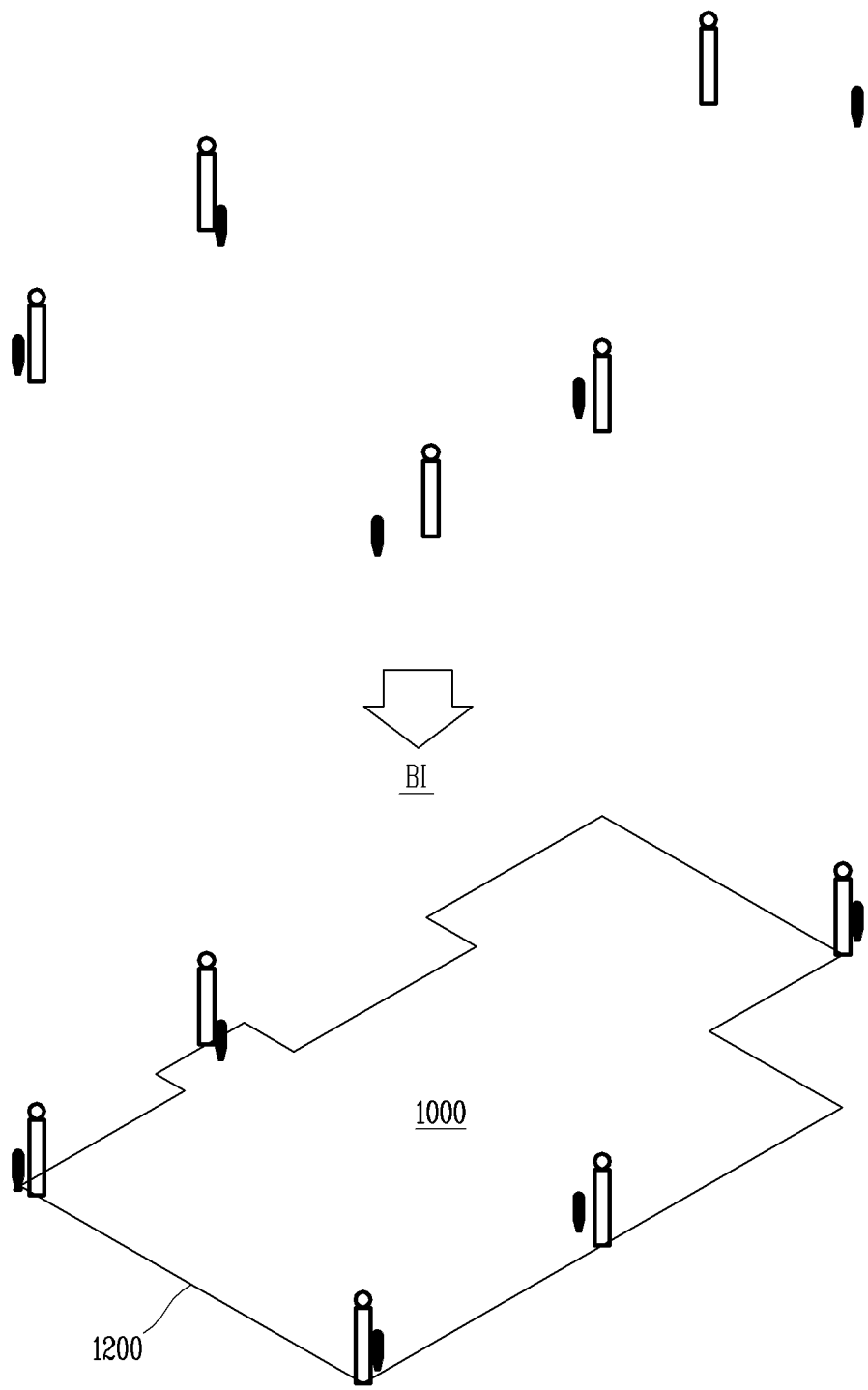
FIG. 13 is an exemplary view illustrating a concept of generating boundary information according to the matching illustrated in FIG. 12.
Figure 14:
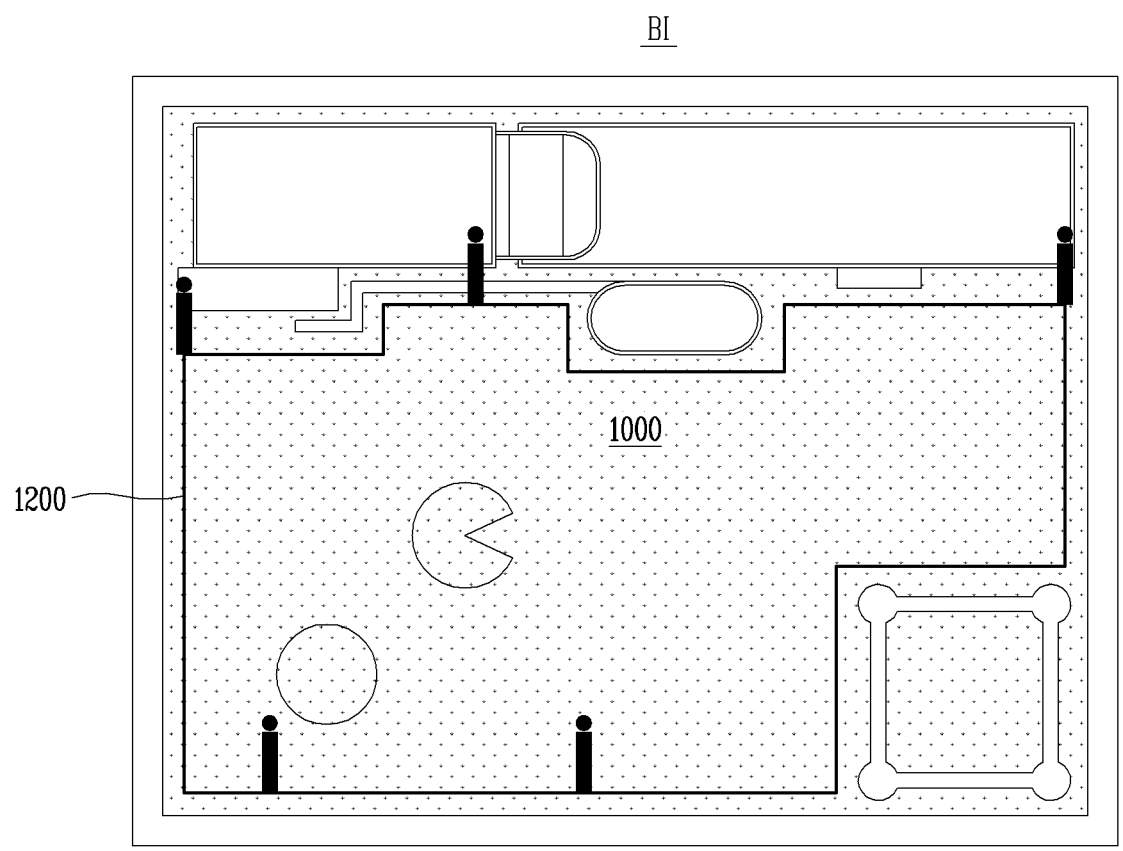
FIG. 14 is an exemplary view of boundary information of the moving robot system disclosed in this specification.

The robot 100 may receive the correction information from the terminal 300 [B10] to generate the boundary information based on the correction information [B11]. That is, the boundary information BI may be generated in a form in which the first position information MI1 is matched with the second position information MI2 as illustrated in FIG. 13 so that the virtual positions of the plurality of transmission devices 200 are corrected according to the installation positions of the plurality of transmission devices 200. Accordingly, the boundary information BI is generated as illustrated in FIG. 14 to set the boundary area 1200.

Figure 15:
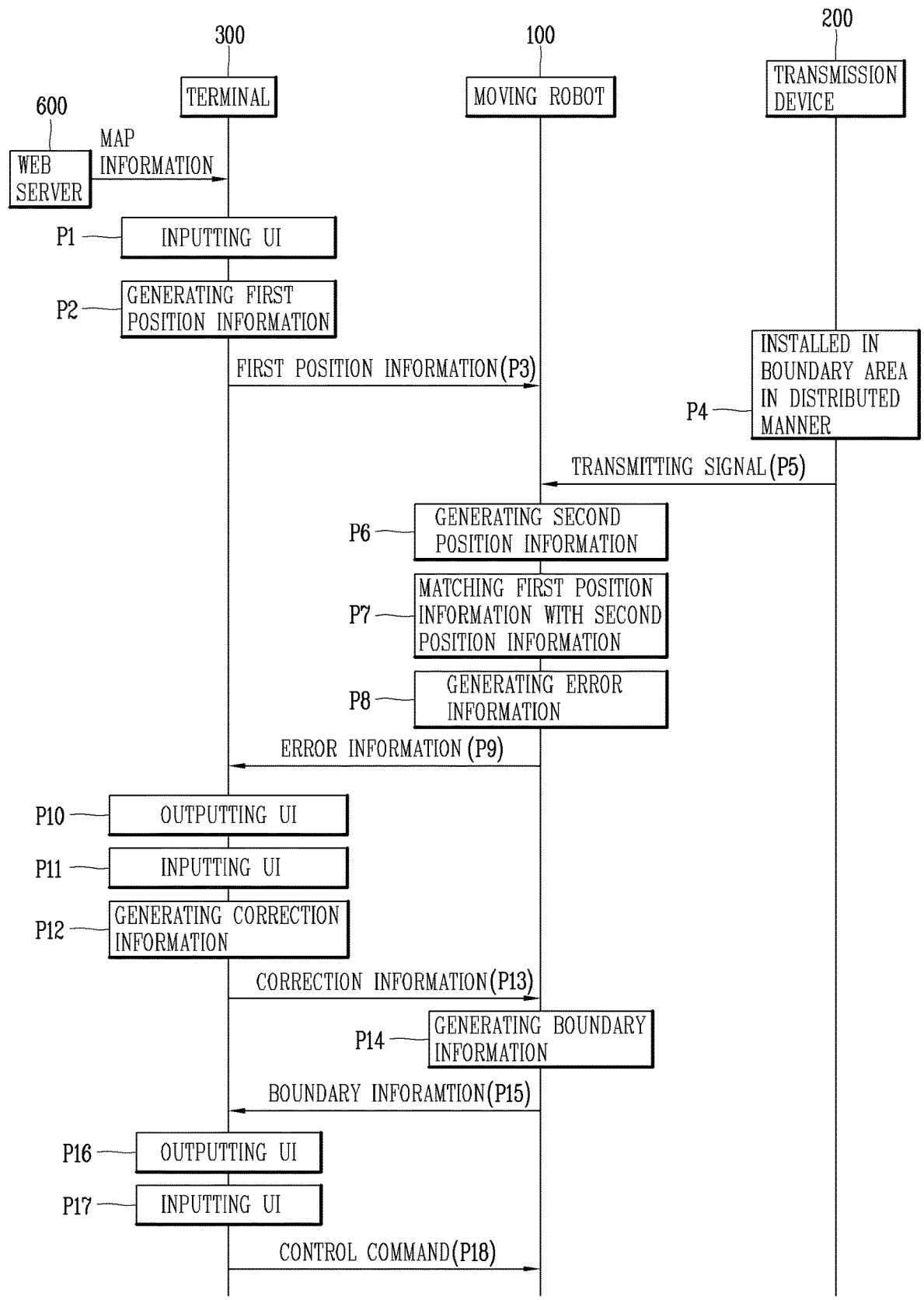
FIG. 15 is an exemplary view showing a detailed boundary information generating process of the moving robot system disclosed in this specification.

Meanwhile, a detailed example of a process of generating the boundary information BI in the system 1 as described above may be as shown in FIG. 15. First, when the terminal 300 receives the map information GM from the web server 600, the map information GM is displayed on the control screen on which virtual positions of the plurality of transmission devices 200 are designated before the plurality of transmission devices 200 is installed, so that a UI input corresponding to a manipulation on the control screen is performed [P1]. In response to a manipulation input on the control screen [P1], the terminal 300 may generate the first position information MI1 according to the virtual positions of the plurality of transmission devices 200 [P2] to transmit the first position information MI1 to the robot 100 [P3].

The robot 100 may receive the first position information MI1 from the terminal 300 [P3], and after the plurality of transmission devices 200 is installed in the boundary area 1200 in a distributed manner according to the first position information MI1 [P4], the robot 100 may receive signals from each of the plurality of transmission devices 200 [P5]. The robot 100 may generate the second position information MI2 according to the installation positions of the plurality of transmission devices 200 based on the transmitted signals [P6] to match the first position information MI1 with the second position information MI2 [P7]. The robot 100 may generate the error information using a result of the matching of the first position information MI1 with the second position information MI2 [P8] to transmit the error information to the terminal 300 [P9].

After receiving the error information from the robot 100 [P9], the terminal 300 may display the map information GM including the first position information MI1 and the error information on the control screen to allow the first position information MI1 to be corrected according to the installation positions of the plurality of transmission devices [P10], and in response to the manipulation input in which positions of the plurality of transmission devices 200 are corrected according to the correction information [P11], the terminal 300 may generate the correction information [P12] to transmit the correction information to the robot 100 [P13].

The robot 100 may receive the correction information from the terminal 300 [P13] to generate the boundary information based on the correction information [P14]. After generating the boundary information [P14], the robot 100 may transmit the boundary information BI to the terminal 300 [P15] so that the boundary information BI is displayed on the terminal 300. Thereafter, the terminal 300 may receive the boundary information BI from the robot 100 [P15] to display the boundary information BI on the control screen [P16], and in response to a manipulation input [P17] performed on the control screen according to the boundary information BI, the terminal 300 may generate a control command [P18] to transmit the control command to the robot 100. Accordingly, the robot 100 may operate according to the control command.

The system 1 as aforementioned may be implemented by using a method for generating boundary information of the moving robot system (hereinafter referred to as "generating method") to be described below. Hereinafter, an embodiment of the generating method will be described, but descriptions repeating the above-mentioned contents may be omitted. The generating method is a method for generating the boundary information in the system 1 described above, which may be applied to the system 1, and may also be applied in addition to the system 1.

Figure 16:
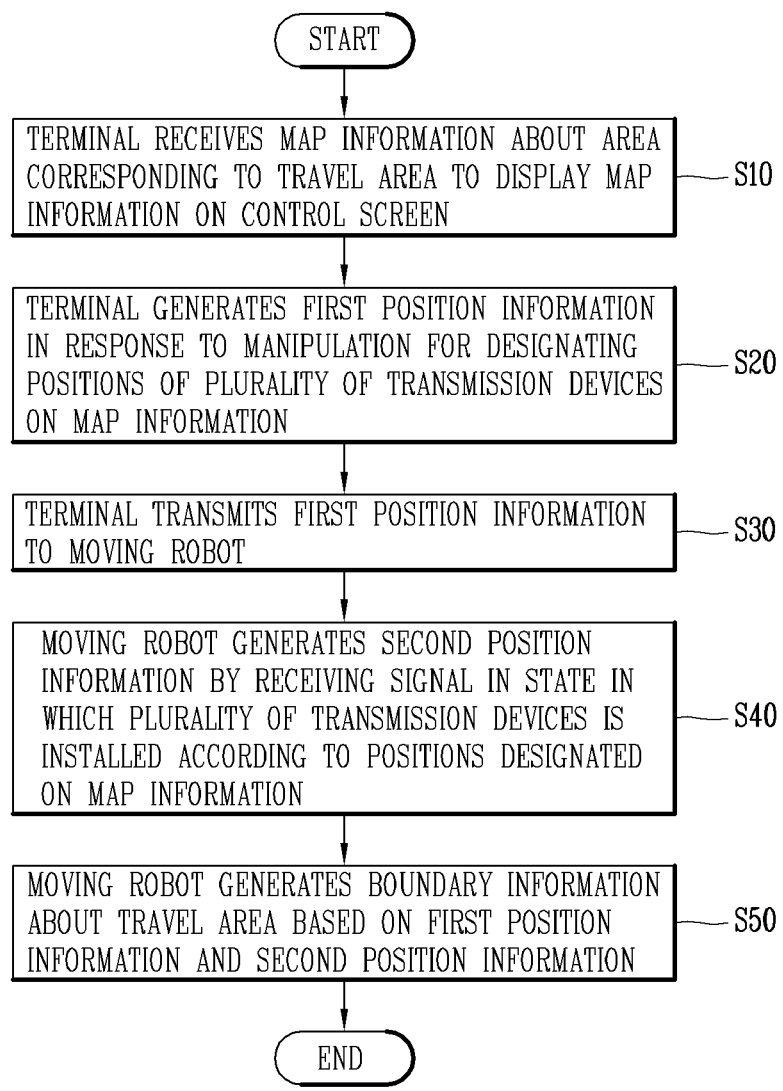
FIG. 16 is a flowchart of a method for generating boundary information of a moving robot system disclosed in this specification.

The generating method may be a method in which the robot 100 and the terminal 300 generate the boundary information in the system 1 including the plurality of transmission devices 200, the terminal 300, and the robot 100. The generating method may also be a method in which the robot 100 and the terminal 300 remotely controlling the robot 100 generate the boundary information in an embodiment where the web server 600 is included in the system 1. The generating method, as shown in FIG. 16, includes displaying map information GM about an area corresponding to the travel area 1000 on the control screen by receiving the map information from the web server 600 by the terminal 300 [S10], generating first position information MI1 in response to a manipulation for designating positions of the plurality of transmission devices 200 on the map information GM by the terminal 300 [S20], transmitting the first position information MI1 to the robot 100 by the terminal 300 [S30], generating second position information MI2 by receiving the signal in a state in which the plurality of transmission devices 200 is installed according to the positions of the plurality of transmission devices 200 designated on the map information GM by the robot 100 [S40], and generating the boundary information BI for the travel area 1000 based on the first position information MI1 and the second position information MI2 by the robot 100 [S50].

That is, in the system 1, the boundary information may be generated in the process including the receiving the map information GM to display the information on the control screen [S10], the generating the first position information MI1 [S20], the transmitting the first position information MI1 to the robot 100 [S30], the generating the second position information MI2 [S40], and the generating the boundary information BI [S50]. Accordingly, the boundary information BI may be generated by the terminal 300 displaying map information GM about an area corresponding to the travel area 1000 on the control screen by receiving the map information from the web server 600 [S10], generating first position information MI1 in response to a manipulation for designating positions of the plurality of transmission devices 200 on the map information GM [S20], and transmitting the first position information MI1 to the robot 100 [S30], and by the robot 100 generating second position information MI2 by receiving the signal in a state in which the plurality of transmission devices 200 is installed according to the positions of the plurality of transmission devices 200 designated on the map information GM [S40], and generating the boundary information BI for the travel area 1000 based on the first position information MI1 and the second position information MI2 [S50].

Here, at least three of the plurality of transmission devices 200 may be installed in a distributed manner in the boundary area 1200 of the travel area 1000. Accordingly, the robot 100 may determine a position of the robot 100 on the travel area 1000 and positions of each of the plurality of transmission devices 200 based on a reception result of transmitted signals. In addition, the web server 600 may store control information related to controlling of the system 1. Accordingly, the web server 600 may transmit the map information GM corresponding to the travel area 1000 to the terminal 300.

In the receiving the map information GM to display the information on the control screen [S10], the map information GM may be received from the web server 600 before the plurality of transmission devices 200 is installed. That is, the receiving the map information GM to display the information on the control screen [S10] and the generating the first position information MI1 [S20] may be performed by the terminal 300 before the plurality of transmission devices 200 is installed.

The first position information MI1 may be information about virtual positions of the plurality of transmission devices 200 designated on the map information GM. The second position information MI2 may be information about positions of the plurality of transmission devices 200 installed according to positions designated on the map information GM.

Figure 17:
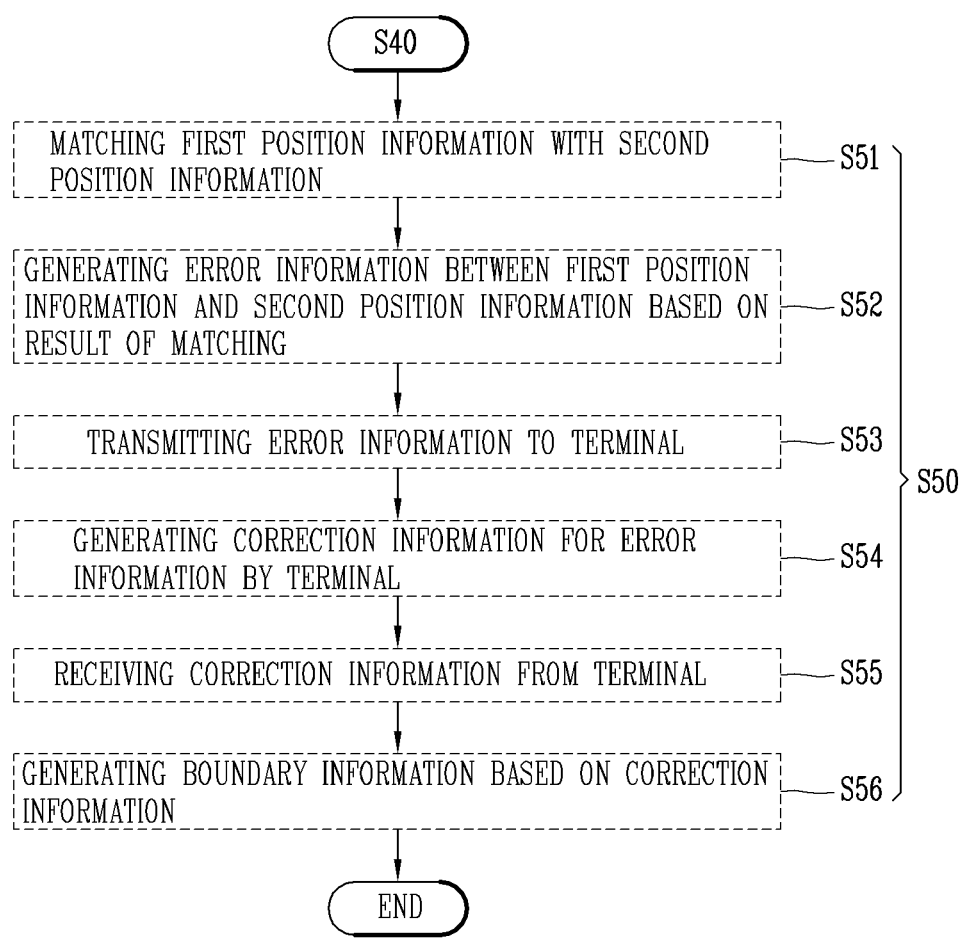
FIG. 17 is a flowchart of a detailed embodiment of a method for generating boundary information of a moving robot system disclosed in this specification.

The generating the boundary information [S50] may include matching of the first position information MI1 with the second position information MI2 [S51], generating error information between the first position information MI1 and the second position information MI2 based on a result of the matching [S52], transmitting the error information to the terminal 300 [S53], generating correction information for the error information by the terminal 300 [S54], receiving the correction information from the terminal 300 [S55], and generating the boundary information based on the correction information [S56], as shown in FIG. 17.

In the matching [S51], the first position information MI1 may be matched with the second position information MI2 according to a preset matching process. In the generating correction information [S54], the terminal 300 may receive the error information to display the map information GM including the error information and the first position information MI1 on the control screen to thereby generate correction information in respond to a manipulation for correcting the positions of the plurality of transmission devices 200 according to the error information on the map information GM. In the generating method, the robot 100 may generate the boundary information BI [S50] to transmit the boundary information to the terminal 300. Accordingly, the boundary information BI is displayed on the terminal 300.

The generating method including the receiving the map information GM to display the information on the control screen [S10], the generating the first position information MI1 [S20], the transmitting the first position information MI1 to the robot 100 [S30], the generating the second position information MI2 [S40], and the generating the boundary information BI [S50] can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 20.

The moving robot system and the method for generating boundary information of the moving robot system as described above may be implemented in a lawn mower robot, a method for controlling a lawn mower robot, means for controlling a lawn mower robot, a lawn mower robot system, a method for setting boundary area of a lawn mower robot, a method for generating/acquiring boundary information of a lawn mower robot system, etc. However, the technology disclosed in this specification is not limited thereto, and may be implemented in any lawn mowing robot, a control element for a lawn mowing robot, a lawn mowing robot system, a method for controlling a lawn mowing robot, or the like to which the technical idea of the above-described technology may be applied.

While the present disclosure has been particularly shown and described with reference to embodiments thereof, it will be understood that various changes in form and details may be made therein without departing from the spirit and scope of the present disclosure as defined by the following claims. Therefore, the scope of the present disclosure may not be limited to the described embodiments, but may be determined not only by the claims below but also by the equivalents of the claims.

Aspects of the present disclosure provide an embodiment of a moving robot system and a method for generating boundary information of the moving robot system capable of overcoming the limitations of the related art as described above. Specifically, an embodiment of a moving robot system and a method for generating boundary information of the moving robot system capable of simply and conveniently obtaining boundary information about a travel area of a moving robot is provided. In addition, an embodiment of a moving robot system and a method for generating boundary information of the moving robot system capable of quickly and easily setting a boundary of a travel area of a moving robot is provided.

An embodiment of a mobile robot system and a method for generating boundary information of the mobile robot system disclosed in this specification is capable of solving the above-described problems by generating boundary information based on map data provided from a web server. Specifically, when a boundary area is set based on map data provided from a web server and a plurality of transmission devices is installed according to the set boundary area, actual installation positions of the plurality of transmission devices are reflected in information about the set boundary area to generate boundary information.

That is, the mobile robot system and the method for generating boundary information of the mobile robot system provided in this specification are to solve the above-described problem by installing a plurality of transmission devices based on map data provided from the web server to generate boundary information by reflecting actual installation positions of the plurality of transmission devices.

The technical features described above may be implemented in a lawn mower robot, a method for controlling a lawn mower robot, a lawn mower robot system, a method for controlling a lawn mower robot, a method for setting boundary area of a lawn mower robot, a method for generating/acquiring boundary information of a lawn mower robot system, etc. This specification provides embodiments of a moving robot system and a method for generating boundary information of the moving robot system having the above-described technical features as a solution.

An embodiment of the moving robot system having the above-described technical features as a solution includes a moving robot including a plurality of transmission devices each installed in a travel area to transmit a signal, a terminal to display a control screen including information related to the travel area, and a moving robot that operates by determining a position of the moving robot on the travel area based on a reception result of the transmitted signal in response to a manipulation on the control screen, wherein the terminal displays map information about an area corresponding to the travel area on the control screen by receiving the map information from a web server, generates first position information in response to a manipulation for designating positions of the plurality of transmission devices on the map information, and transmits the first position information to the moving robot, and wherein the moving robot generates second position information by receiving the signal in a state in which the plurality of transmission devices is installed according to the positions of the plurality of transmission devices designated on the map information, and generates boundary information about the travel area based on the first position information and the second position information.

In addition, an embodiment of a method for generating boundary information of a moving robot system having the above-described technical features as a solution is a method for generating boundary information of a moving robot system including a plurality of transmission devices each installed in a travel area to transmit a signal, a terminal to display a control screen including information related to the travel area, and a moving robot that operates by determining a position of the moving robot on the travel area based on a reception result of the transmitted signal in response to a manipulation on the control screen, the method includes displaying map information about an area corresponding to the travel area on the control screen by receiving the map information from a web server by the terminal, generating first position information in response to a manipulation for designating positions of the plurality of transmission devices on the map information by the terminal, transmitting the first position information to the moving robot by the terminal, generating second position information by receiving the signal in a state in which the plurality of transmission devices is installed according to the positions of the plurality of transmission devices designated on the map information by the moving robot, and generating the boundary information about the travel area based on the first position information and the second position information by the moving robot.

A method for generating boundary information of the mobile robot system in this specification has an effect that a boundary of a travel area can be set in a quick and easy way and also in a simple and convenient way by generating boundary information based on map data provided from a web server. In addition, by generating boundary information by reflecting actual installation positions of the plurality of transmission devices in information for setting the boundary area, boundary can be accurately set according to the actual installation positions of the plurality of transmission devices.

In addition, a mobile robot system and a method for generating boundary information of the mobile robot system in this specification generates boundary information according to map data that is based on actual installation positions and ensures visibility and reliability to thereby set a boundary area in detail and set a boundary according to user's convenience and requirement. As a result, the mobile robot system can be controlled in various ways and controlled efficiently, so that efficiency, effectiveness, and usability of the mobile robot system are increased.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot system, comprising:
a plurality of transmission devices that are installed at a travel area to transmit signals; and
a moving robot that receives the signals from the plurality of transmission devices and first position information from a terminal,
wherein before boundary information about the travel area is generated, the terminal determines map information about the travel area, generates the first position information based on the map information and in response to a manipulation for designating positions of the plurality of transmission devices based on the map information, and transmits the first position information to the moving robot,
wherein the moving robot generates second position information based on the signals received from the plurality of transmission devices and generates the boundary information based on the first position information and the second position information,
wherein the first position information s information about virtual positions of the plurality of transmission devices designated on the map information,
wherein the second position information is information about installation positions of the plurality of transmission devices installed according to the positions of the plurality of transmission devices designated on the map formation, and
wherein the terminal receives the map information and displays the map information before the plurality of transmission devices are installed.

2. The moving robot system of claim 1, wherein at least three of the plurality of transmission devices are distributed in a boundary area of the travel area.

3. The moving robot system of claim 1, wherein the terminal receives the map information from a web server, and the web server stores control information related to control of the moving robot system.

4. The moving robot system of claim 1, wherein the first position information identifies designated positions of the plurality of transmission devices.

5. The moving robot system of claim 1, wherein the second position information identifies detected positions of the plurality of transmission devices that are determined based on the signals.

6. The moving robot system of claim 1, wherein the moving robot generates the boundary information based on comparing the first position information and the second position information.

7. The moving robot system of claim 6, wherein the moving robot generates error information between the first position information and the second position information based on comparing the first position information and the second position information, transmits the error information to the terminal, receives correction information for the error information from the terminal, and generates the boundary information further based on the correction information.

8. The moving robot system of claim 7, wherein the moving robot, when generating the error information, compares the first position information and the second position information according to a preset matching process, and calculates a position error between the first position information and the second position information based on comparing the first position information and the second position information.

9. The moving robot system of claim 7, wherein the terminal outputs a display associated with the error information, and generates the correction information based on another user input for correcting the positions of the plurality of transmission devices on the map information.

10. A method for generating boundary information of a moving robot system comprising a plurality of transmission devices installed in a travel area to transmit signals, a terminal to display information related to the travel area, and a moving robot that operates in the travel area, the method comprising:
displaying, by the terminal, map information associated with the travel area, before boundary information about the travel area is generated;
generating, by the terminal, first position information in response to a manipulation for designating positions of the plurality of transmission devices on the map information;
transmitting, by the terminal, the first position information to the moving robot;
generating, by the moving robot, second position information based on the signals received from the plurality of transmission devices; and
generating, by the moving robot, the boundary information about the travel area based on the first position information and the second position information,
wherein the first position information is information about virtual positions of the plurality of transmission devices designated on the map information,
wherein the second position information is information about installation positions of the plurality of transmission devices installed according to the positions of the plurality of transmission devices designated on information, and
wherein the terminal receives and displays the map information before the plurality of transmission devices are installed.

11. The method of claim 10, wherein at least three of the plurality of transmission devices are distributed in a boundary area of the travel area.

12. The method of claim 10, wherein the terminal receives the map information from a web server, and the web server stores control information related to control of the moving robot system.

13. The method of claim 10, wherein the first position information identifies the designated positions of the plurality of transmission devices.

14. The method of claim 10, wherein the second position information identifies detected positions of the plurality of transmission devices associated with the received signals.

15. The method of claim 10, wherein generating the boundary information includes:
- comparing the first position information and the second position information;
- generating error information based on comparing the first position information and the second position information;
- transmitting the error information to the terminal;
- generating, by the terminal, correction information for the error information;
- receiving, by the moving robot, the correction information from the terminal; and
- generating, by the moving robot, the boundary information based on the correction information.

16. The method of claim 15, wherein comparing the first position information and the second position information includes comparing the first position information and the second position information according to an iterative closest point (ICP) matching technique.

17. The method of claim 15, wherein generating the correction information includes:
- displaying the map information with the error information and the first position information; and
- generating the correction information based on another user input related to correcting the positions of the plurality of transmission devices on the map information according to the error information.

18. The method of claim 10, further comprising transmitting, by moving robot, the boundary information to the terminal.

* * * * *